(12) United States Patent
Yang et al.

(10) Patent No.: US 12,490,987 B2
(45) Date of Patent: Dec. 9, 2025

(54) SURGICAL INSTRUMENT

(71) Applicant: Reach Surgical, Inc., Tianjin (CN)

(72) Inventors: Chao Yang, Tianjin (CN); Peng Hao, Tianjin (CN); Shuaishuai Li, Tianjin (CN); Jianjun Song, Tianjin (CN); Ke Li, Tianjin (CN)

(73) Assignee: REACH SURGICAL, INC., Tianjin (CN)

( * ) Notice: Subject to any disclaimer, the term of this patent is extended or adjusted under 35 U.S.C. 154(b) by 151 days.

(21) Appl. No.: 18/424,494

(22) Filed: Jan. 26, 2024

(65) Prior Publication Data
US 2024/0164781 A1    May 23, 2024

Related U.S. Application Data

(63) Continuation of application No. PCT/CN2022/106013, filed on Jul. 15, 2022.

(30) Foreign Application Priority Data

Jul. 29, 2021   (CN) .......................... 202110865511.X

(51) Int. Cl.
*A61B 17/115* (2006.01)
*A61B 17/00* (2006.01)
*A61B 90/00* (2016.01)

(52) U.S. Cl.
CPC ............. *A61B 17/115* (2013.01); *A61B 90/08* (2016.02); *A61B 2017/00353* (2013.01); *A61B 2017/00982* (2013.01); *A61B 2090/0811* (2016.02)

(58) Field of Classification Search
CPC ........ A61B 17/115; A61B 2017/00353; A61B 2017/00982; A61B 2090/0811;
(Continued)

(56) References Cited

U.S. PATENT DOCUMENTS 9,867,612 B2 *   1/2018   Parihar ............ A61B 17/07207
10,314,579 B2 *  6/2019   Chowaniec .......... A61B 17/072
(Continued)

FOREIGN PATENT DOCUMENTS

CN       101401736 A       4/2009
CN       103767749 A       5/2014
(Continued)

OTHER PUBLICATIONS

Office Action issued in connection with Japanese Appl. No. 2024-505542 dated Dec. 10, 2024.
(Continued)

*Primary Examiner* — Julian W Woo
(74) *Attorney, Agent, or Firm* — FOLEY & LARDNER LLP

(57) ABSTRACT

A surgical instrument includes an elongated body assembly adapted for being attached with a loading unit, wherein the loading unit may have various types. The elongated body assembly is provided with a loading unit type recognition portion that includes a first sliding member configured for being actuated by the loading unit during assembling of the loading unit, so as to be moved to a predetermined position; a first trigger member arranged on the first sliding member; a first circuit board, the first circuit board being provided with at least two first response members, and each first response member being configured to cooperate with the first trigger member to conduct or cut off one first electrical branch, and each of the first electrical branches may have a different load value; and a controller configured to determine the type of the loading unit according to a feedback signal from the first circuit board.

20 Claims, 14 Drawing Sheets

(58) Field of Classification Search
CPC .................. A61B 90/90; A61B 90/98; A61B 2017/00017; A61B 2090/0803; A61B 2090/0808; A61B 17/00234; A61B 2017/00398

See application file for complete search history.

(56) References Cited

U.S. PATENT DOCUMENTS

| | | | |
|---|---|---|---|
| 2009/0090763 | A1 | 4/2009 | Zemlok et al. |
| 2009/0206144 | A1 | 8/2009 | Doll et al. |
| 2010/0211053 | A1 | 8/2010 | Ross et al. |
| 2014/0110456 | A1 | 4/2014 | Taylor |
| 2015/0351765 | A1 | 12/2015 | Valentine et al. |
| 2015/0374371 | A1 | 12/2015 | Richard et al. |
| 2016/0001447 | A1 | 1/2016 | Iida |
| 2017/0209147 | A1 | 7/2017 | Scirica |

FOREIGN PATENT DOCUMENTS

| | | | |
|---|---|---|---|
| CN | 105213041 | A | 1/2016 |
| CN | 108969123 | A | 12/2018 |
| CN | 111759385 | A | 10/2020 |
| CN | 113397616 | A | 9/2021 |
| JP | S59-040603 | U | 3/1984 |
| JP | 2000-046502 | A | 2/2000 |
| JP | 2008-064208 | A | 3/2008 |
| JP | 2011-019904 | A | 2/2011 |
| JP | 2015-537187 | A | 12/2015 |
| WO | WO-2020/131685 | A1 | 6/2020 |

OTHER PUBLICATIONS

International Search Report issued in connection with PCT Appl. Ser. No. PCT/CN2022/106013 mailing date Oct. 19, 2022.

Extended European Search Report issued in EP Appl. No. 22848298.0 dated Oct. 10, 2024.

Office Action issued in Japanese Appl. No. 2024-505542 dated Jun. 17, 2025.

* cited by examiner

SURGICAL INSTRUMENT

CROSS-REFERENCE TO RELATED PATENT APPLICATIONS

This application is a continuation of International Application No. PCT/CN2022/106013 filed on Jul. 15, 2022, which claims the benefit of and priority to Chinese Patent Application No. 202110865511.X, filed Jul. 29, 2021. The entire disclosures of International Application No. PCT/CN2022/106013 and Chinese Patent Application No. 202110865511.X are incorporated herein by reference in their entireties.

BACKGROUND

The present disclosure relates to the field of surgical instruments, and particularly to a surgical instrument capable of recognizing a type of a loading unit.

Surgical instruments may be used in surgeries for clamping, cutting and anastomosis tissues. Traditional surgical stapling instruments comprise a loading unit and a handle assembly. The loading unit is an end effector of the surgical instrument, which is used for clamping a tissue to be cut/anastomosed. Because the handle assembly may be used for multiple times in one surgery, while the loading unit is disposable, the loading unit is usually detachably assembled on the handle assembly, and corresponding loading units are replaced according to different situations. Because different types of the loading units may need different stroke lengths of actuation, it is necessary to transmit relevant information of the loading unit (such as the type of the loading unit) to a control unit on the handle assembly of the surgical instrument when replacing different loading units, so that the corresponding actuation is selected according to the type of the loading unit to make the loading unit execute an operation, thus avoiding a medical accident.

Known surgical instruments are usually provided with a recognition unit to identify the type of the loading unit. Currently, the recognition units usually adopt an RFID scanning recognition method, in which an RFID chip needs to be attached to the loading unit, and the handle part is provided with a reading device. When in use, an operator makes the RFID chip attached to the loading unit approach the reading device for scanning, and then inserts the loading unit into the handle, and the control unit obtains the type information of the loading unit according to information read by the reading device. According to this recognition method, the RFID needs to be scanned before the loading unit is inserted.

SUMMARY

It is provided in one embodiment of the present disclosure, a surgical instrument, comprising a handle assembly adapted for being attached with a loading units, wherein the loading unit may have various types, and the handle assembly comprising a handle portion and an elongated body assembly, wherein the elongated body assembly is provided with a recognition portion for identifying the type of the loading unit, which comprises a first sliding member slidably arranged in an outer shell of the elongated body assembly, wherein the first sliding member is configured for being actuated by the loading unit during assembling of the loading unit, so as to be moved to a predetermined position; a first trigger member arranged on the first sliding member, adapted for being moved to the predetermined position along with the first sliding member; a first circuit board arranged in the outer shell of the elongated body assembly, wherein the first circuit board is provided with at least two first response members, each of the first response members is configured for cooperating with the first trigger member to conducting or cut-off one first electrical branch, and wherein each of the first electrical branches has a different load value; and a controller configured to determine the type of the loading unit according to a feedback signal from the first circuit board.

In one embodiment, at least two first response members are spaced arranged on the first circuit board in a sliding direction of the first sliding member, adapted for being engaged with the first trigger member when the first trigger member moves to the predetermined position.

In one embodiment, at least two first trigger members are spaced arranged on the first sliding member in a sliding direction of the first sliding member, and at least two first response members are spaced arranged on the first circuit board so as to be engaged when the first trigger member moves to the predetermined positions.

In one embodiment, the first sliding member may be actuated to slide under the insertion or rotation of the loading unit, so that the first trigger member is engaged with the first response member in the predetermined position.

In one embodiment, the first electrical branch is conducted when the first trigger member is engaged with the first response member, and the first trigger member is in surface contact or line contact with the first response member.

In one embodiment, the first response member is configured as a conductive piece arranged on the first circuit board; the first trigger member is configured as an elastic conductive sheet; one end of the first trigger member is connected to the first sliding member, and the other end of the first trigger member abuts against the first circuit board, and when the first sliding member drives the elastic conductive sheet to slide to be in contact with the conductive piece, the first electrical branch on which the conductive piece is arranged is conducted.

In one embodiment, the first electrical branch is cut off when the first trigger member is engaged with the first response member, and a length of the first trigger member is configured to match with a distance between adjacent first response members, so that one first electrical branch is cut-off when the first trigger member moves to the predetermined position.

In one embodiment, the first electrical branch is cut off when the first trigger member is engaged with the first response member, and a length of the first trigger member is configured to match with a distance between adjacent first response members, so that a plurality of first electrical branches are cut-off when the first trigger member moves to the predetermined position.

In one embodiment, the first response member comprises two elastic conductive pieces abutting against each other, and the two elastic conductive pieces are in electrical connection to form one first electrical branch; and the first trigger member is an insulative protrusion arranged on the first sliding member, and the insulative protrusion is moved to a position between the two elastic conductive pieces under the actuation of the first sliding member, so as to cut the electrical connection of the first electrical branch.

In one embodiment, a first biasing member is adapted for biasing the first sliding member in an initial position for adapting with the loading unit.

In one embodiment, a frame is arranged in the outer shell of the elongated body assembly; a sliding groove is arranged on the frame; the first circuit board is fixedly arranged on a bottom portion of the sliding groove, the first sliding member is slidably connected to the sliding groove, and the first biasing member is located between the sliding groove and the first sliding member.

In one embodiment, an indicating unit is included, wherein the indicating unit is configured for providing a first indicating signal for indicating the type of the loading unit according to a signal from the controller.

In one embodiment, a feature portion is arranged on the proximal side of the loading unit, comprising a recognition action surface adapted for cooperating with the recognition portion for identifying the type of the loading unit, wherein the location of the recognition action surface represents the type of the loading unit.

In one embodiment, the recognition action surface is adapted for being engaged with the first sliding member to make the first sliding member slide in a longitudinal axis direction of the elongated body assembly or a circumferential direction of the elongated body assembly.

In one embodiment, a determine portion is included for determining whether the loading unit is well assembled, which comprises a second sliding member and a third sliding member slidably arranged in the outer shell of the elongated body assembly respectively, wherein the second sliding member is configured for cooperating with an engagement nub of the loading unit, and the third sliding member is configured for cooperating with a proximal portion of the loading unit, when the loading unit is well assembled, the second sliding member is actuated to move to a set position corresponding to the type of the loading unit, and the third sliding member is actuated to move to a set position; a second trigger member and a third trigger member, wherein the second trigger member is connected with the second sliding member, and the third trigger member is connected with the third sliding member; a second circuit board fixedly arranged in the outer shell of the elongated body assembly, wherein the second circuit board is provided with a second response member and a third response member, the second response member is configured for cooperating with the second trigger member to switch the second electrical branch between a first state and a second state, and the third response member is configured for cooperating with the third trigger member to switch the third electrical branch between a third state and a fourth state; and signals representing at least two states are provided by the second circuit board, respectively indicating the loading unit is inserted in place and rotated in place; and a controller configured to determine whether the loading unit is well assembled according to a feedback signal from the second circuit board.

In one embodiment, a second biasing member is arranged between the second sliding member and the outer shell of the elongated body assembly, when the loading unit is in inserted-in-place position, the engagement nub of the loading unit abuts against the second sliding member, and the second trigger member is engaged with the second response member to switch the second electrical branch into the first state; and when the loading unit is in rotated-in-place position, the second sliding member is biased to a distal portion of the elongated body assembly under an action of the second biasing member, and the second trigger member is disengaged from the second response member to switch the second electrical branch into the second state.

In one embodiment, a third biasing member is arranged between the third sliding member and the outer shell of the elongated body assembly, when the loading unit is in the inserted-in-place position and the rotated-in-place position, the third trigger member triggers the third response member to switch the third electrical branch into the third state; and when the loading unit is in the position where it is not inserted, the third sliding member is biased to a distal portion of the elongated body assembly under an action of the third biasing member, and the third trigger member is disengaged from the third response member to switch the third electrical branch into the fourth state.

In one embodiment, the second response member and the third response member are electrical switches, respectively, and the second trigger member and the third trigger member are configured to be engaged with the electrical switches so as to switching the states of the second electrical branch and the third electrical branch.

In one embodiment, the second response member/third response member is configured as an electrical contact, and the second trigger member cooperates with the second response member to form a switch for conducting or cutting off the second electrical branch; and the third trigger member cooperates with the third response member to form a switch for conducting or cutting off the second electrical branch.

In one embodiment, a plurality of first electrical branches are connected in parallel to form a loading unit type recognition circuit, and the second electrical branch and the third electrical branch are connected in series to form a loading unit well-assembled recognition circuit; and the loading unit type recognition circuit and the loading unit well-assembled recognition circuit are connected in series to the controller.

In one embodiment, the loading unit type recognition circuit further comprises a first load branch connected in parallel with the first electric branch; and in the loading unit well-assembled recognition circuit, the first state and the second state of the second electrical branch correspond to two electrical branches with different load values, and the third state and the fourth state of the third electrical branch correspond to connecting the electrical branch and disconnecting the electrical branch; and when the loading unit is in the position where it is not inserted and the position where it is rotated in place, the loading unit type recognition circuit and the loading unit well-assembled recognition circuit are in a conducted state, and the load values in the two states are different; and when the loading unit is in the inserted-in-place position, the loading unit type recognition circuit and the loading unit well-assembled recognition circuit are in a unconducted state.

In one embodiment, the loading unit type recognition circuit further comprises a first load branch connected in parallel with the first electric branch; in the loading unit well-assembled recognition circuit, the first state and the second state of the second electrical branch correspond to two electrical branches with different load values, and the third state and the fourth state of the third electrical branch correspond to two electrical branches with different load values; and when the loading unit is in the position where it is not inserted, the position where it is inserted in place and the position where it is rotated in place, the loading unit type recognition circuit and the loading unit well-assembled recognition circuit are in a conducted state, and the load values in the two states are different.

In one embodiment, further comprising an indicating unit, wherein the indicating unit is configured for providing a second indicating signal for indicating well-assembled of the loading unit according to a signal from the controller.

In one embodiment, an end portion of the loading unit comprises a first inserting section and a second inserting section which are sequentially connected from the distal end to the proximal end, and an outer diameter of the first inserting section is larger than that of the second inserting section; the engagement nub is arranged on the first inserting section; a step formed between the first inserting section and the second inserting section is adapted for being engaged with the first sliding member, and an end-face of the second inserting section is adapted for being engaged with the third sliding member, wherein the second inserting has a length relevant to the type of the loading unit.

In one embodiment, the engagement nub of the loading unit is configured as a locking protrusion arranged at an end portion of the loading unit, a locking sliding groove is arranged inside the outer shell of the elongated body assembly, and the locking protrusion is configured to be engaged with the locking sliding groove so as to lock the loading unit from rotation.

BRIEF DESCRIPTION OF THE DRAWINGS

Preferred embodiments in the present disclosure will be described in detail hereinafter with reference to the drawings, which will be beneficial for understanding the objects and advantages of the present disclosure, wherein.

DETAILED DESCRIPTION

The technical solutions of the present disclosure are clearly and completely described hereinafter with reference to the drawings, and in the description of the present disclosure, it should be noted that the term "distal side/end" refers to a portion of a part, an instrument and/or a device far away from an operator (such as a doctor who uses the instrument) or a component thereof when the surgical instrument is operated, while the term "proximal side/end" refers to a portion of the part, the instrument and/or the device are close to the operator or a component thereof. Moreover, the terms "first", "second" and "third" are used for descriptive purposes only and cannot be understood as indicating or implying relative importance. The terms "installation", "connected" and "connection" should be understood in a broad sense. For example, they may be fixed connection, removable connection or integrated connection; and may be direct connection, or indirect connection through an intermediate medium, and connection inside two elements. The specific meanings of the above terms in the present disclosure can be understood in a specific case by those of ordinary skill in the art.

In addition, the technical features involved in different embodiments of the present disclosure described hereinafter may be combined with each other as long as they do not conflict with each other.

Figure 1:
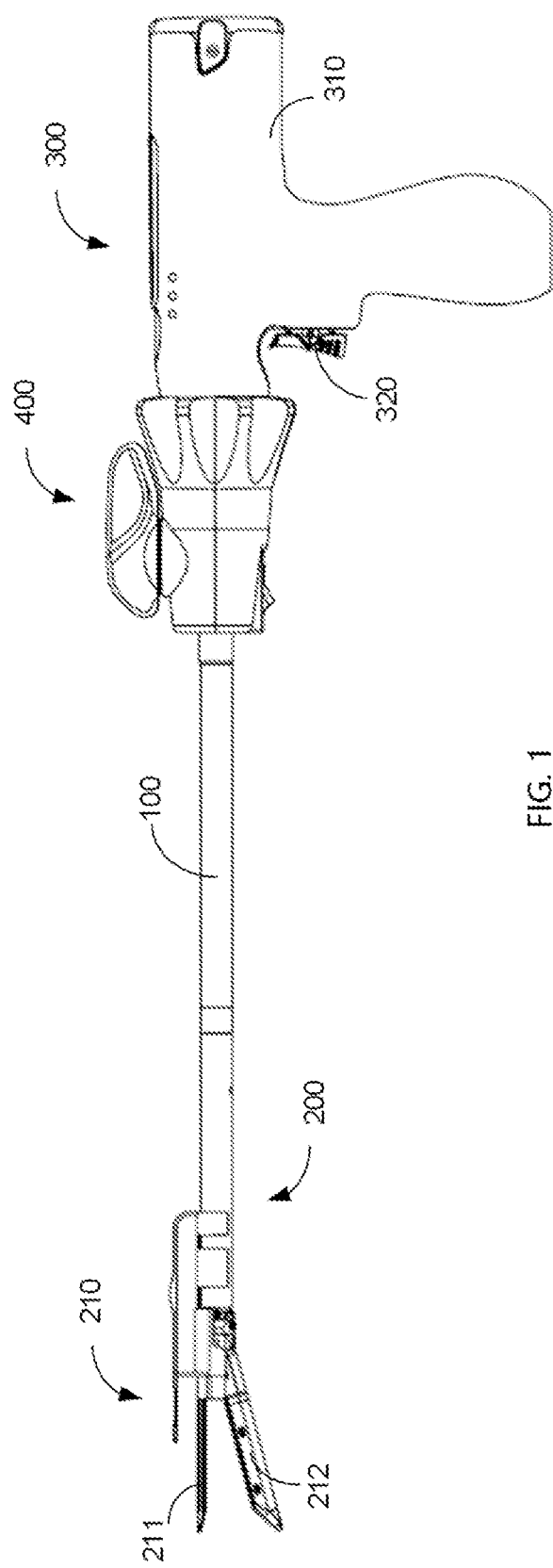
FIG. 1 is a schematic diagram of an overall structure of one embodiment of a surgical instrument of the present disclosure.

FIG. 1 is a schematic structural diagram of one embodiment of a surgical instrument. The illustrated embodiment is an endoscopic instrument, and typically, the embodiment of the surgical instrument described herein is an endoscopic surgical instrument for cutting and anastomosis. However, it should be understood that the surgical instrument may also be a non-endoscopic surgical instrument for cutting and anastomosis, such as an open surgical instrument for open surgery.

Figure 2:
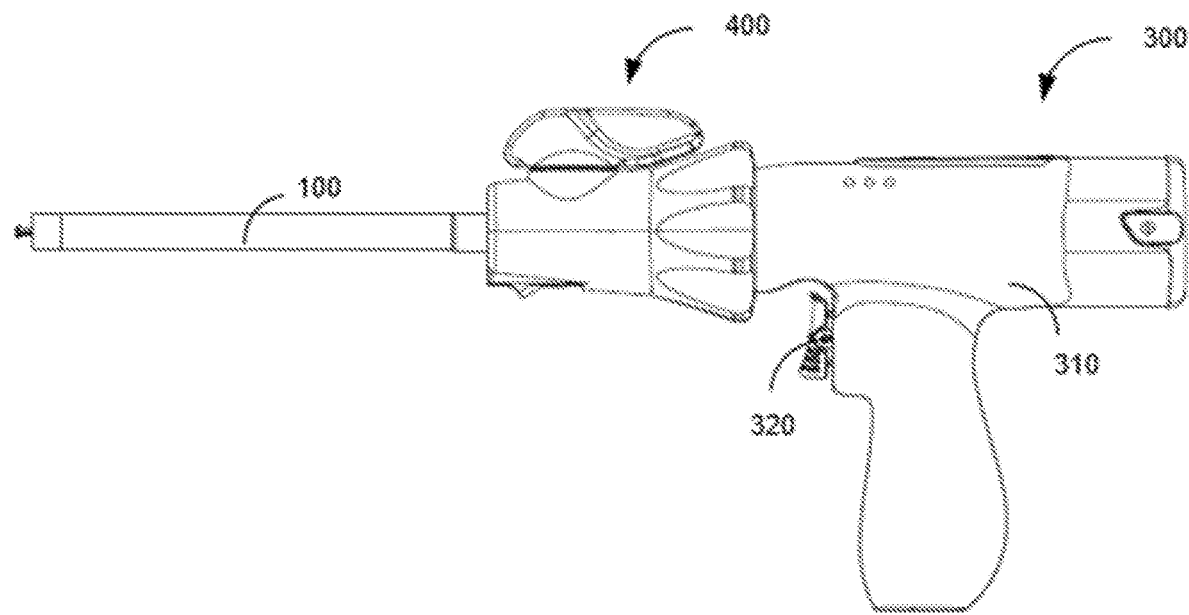
FIG. 2 is a schematic diagram of a handle assembly of one embodiment of the surgical instrument of the present disclosure.

The surgical instrument shown in FIG. 1 and FIG. 2 comprises a handle assembly and a loading unit 200 which may be detachably coupled with each other, wherein the handle assembly may be adapted for being assembled with the loading unit 200 that may have various types, a distal end of the loading unit 200 is provided with an end effector 210, which comprises an anvil assembly 211 and a staple cartridge assembly 212, the anvil assembly 211 and the staple cartridge assembly 212 form a jaw, and the end effector 210 is adapted for executing a specific surgical operation, such as clamping, suturing/anastomosing and cutting a tissue. A movable firing member (not shown in FIG. 1) for executing the specific surgical operation is arranged in the end effector 210. The handle assembly comprises a handle portion 300 and an elongated body assembly 100, the elongated body assembly 100 defines a longitudinal axis, and the longitudinal axis extends distally from a distal end of the handle portion 300. A distal end of the elongated body assembly 100 is detachably connected with the loading unit 200.

Further, as shown in FIG. 1 and FIG. 2, the handle portion 300 comprises a handle body 310 and an actuating member 320, and by operating the actuating member 320, the closing, opening, suturing/anastomosing, cutting and other operations of the end effector 210 are performed.

In an alternative embodiment, the handle portion 300 and the elongated body assembly 100 can be detachably coupled with each other, and the handle portion 300 is configured to be selectively connected with the elongated body assembly 100.

It should be noted that, although the end effector 210 for cutting and anastomosing a tissue is provided in the embodiment of the surgical instrument described herein, other technologies for cutting and anastomosing a tissue are also provided in an alternative embodiment. For example, the end effector for anastomosing a tissue by using radio frequency (RF) energy or an adhesive may also be used.

Further, as shown in FIG. 1, in the embodiment of the present disclosure, the handle assembly further comprises a rotating knob assembly 400. The rotating knob assembly 400 is arranged on the distal portion of the handle portion 300 and fixedly connected with a proximal end of the elongated body assembly 100, and when the rotating knob assembly 400 is operated to rotate around the longitudinal axis of the surgical instrument, the elongated body assembly 100 and the loading unit 200 can be driven to rotate together.

The surgical instrument in the embodiment above further comprises a recognition portion for identifying the type of the loading unit 100a for recognizing the type of the loading unit, so as to control a driving system to provide driving according to the type of the loading unit.

Figure 4:
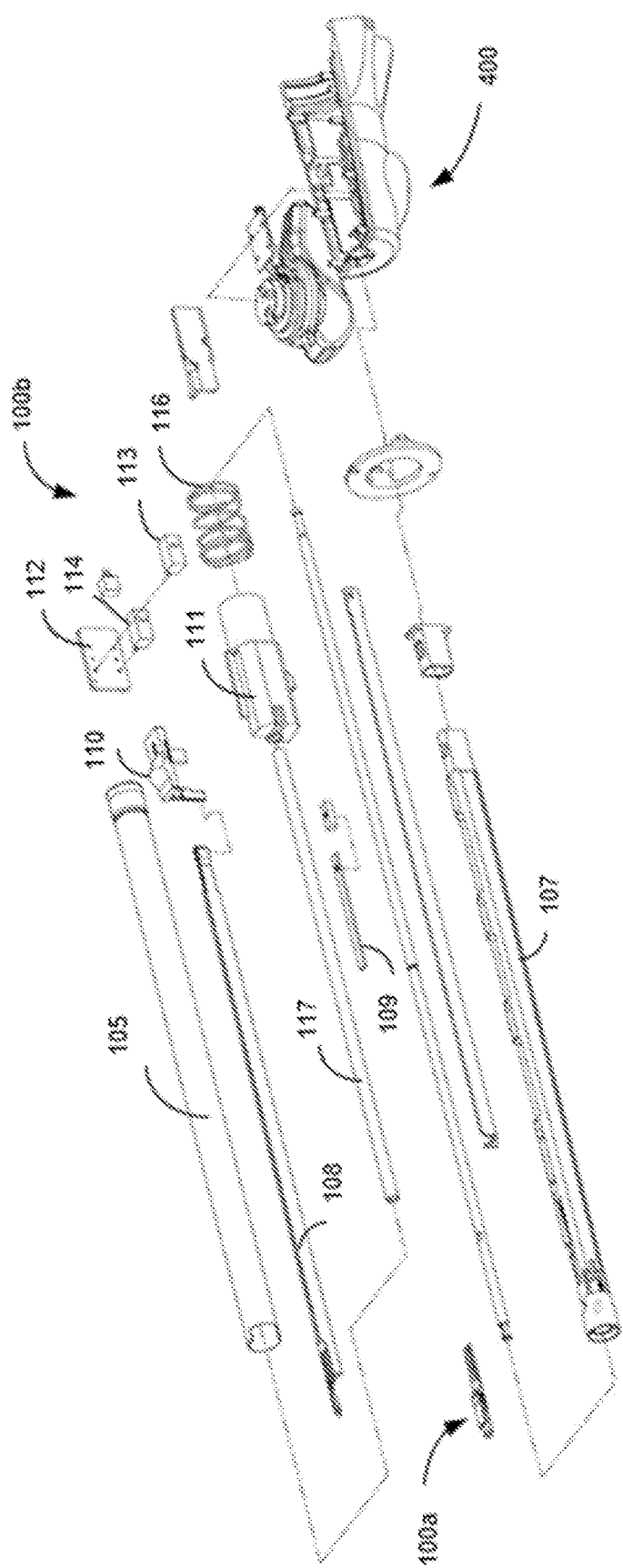
FIG. 4 is an exploded view of one embodiment of a loading unit determine portion in the surgical instrument of the present disclosure.
Figure 5:
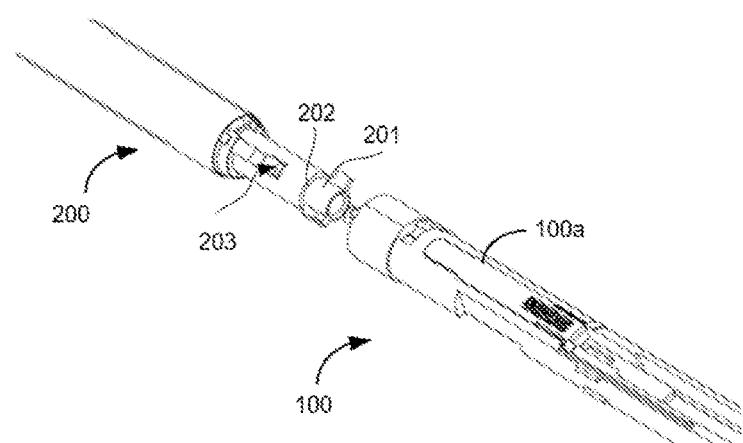
FIG. 5 is a schematic structural diagram of a connecting structure between a loading unit and an elongated body assembly in the surgical instrument of the present disclosure.

Specifically, as shown in FIG. 4, the recognition portion 100a for identifying the type of the loading unit is arranged at a distal portion of the elongated body assembly 100, and the type of the loading unit 200 may be determined according to the recognition portion, so as to facilitate a further surgical operation. A specific implementation mode of the recognition portion 100a is introduced hereinafter.

Figure 6:
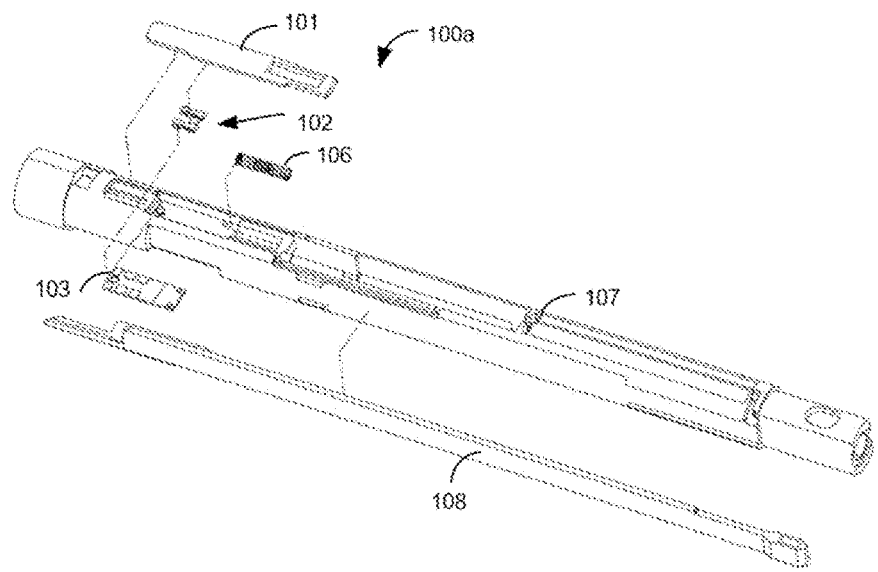
FIG. 6 is an exploded view of one embodiment of a loading unit type recognition portion in the surgical instrument of the present disclosure.

As shown in FIG. 6, the recognition portion for identifying the type of the loading unit 100a comprises: a first sliding member 101 slidably arranged in an outer shell 105 of the elongated body assembly 100, a first trigger member 102 arranged on the first sliding member 101 that may be actuated to slide along with the first sliding member, a first circuit board 103 mounted in the outer shell 105 of the elongated body assembly 100 and fixed relative to the elongated body assembly, and a controller configured to determine the type of the loading unit 200 according to a feedback signal from the first circuit board 103. Specific mounting positions of the first sliding member 101 and the first circuit board 103 are not unique; and the first sliding member and the first circuit board may be selectively connected to the outer shell 105 of the elongated body assembly 100, or to a frame 107 on an inner side of the outer shell 105 of the elongated body assembly 100.

The first sliding member 101 is configured for cooperating with the loading unit 200, and the loading units 200 of different types may trigger the first sliding member 101 to slide to a different predetermined position along a longitudinal axis direction or a circumferential direction of the elongated body assembly 100 in a mounting and locking process of axial insertion or circumferential rotation, thus driving the first trigger member 102 to slide to a different predetermined position.

Specifically, FIG. 4 to FIG. 20 and FIG. 24 to FIG. 25 show the embodiment of the surgical instrument in which the type of the loading unit is recognized according to an axial insertion and mounting action of the loading unit 200. The first sliding member 101 capable of cooperating with the loading unit 200 is axially and slidably arranged in the elongated body assembly 100; and when the loading units 200 of different types are inserted, the first sliding member 101 is triggered to slide to different predetermined positions in the longitudinal axis direction, thus driving the first trigger member 102 to slide to different predetermined positions.

Figure 15:
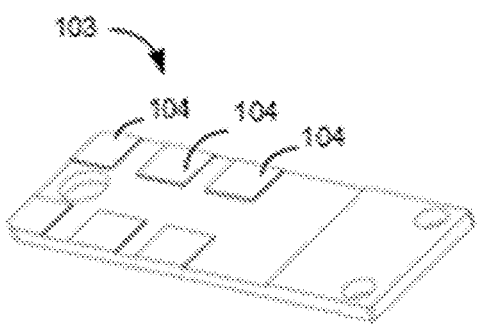
FIG. 15 is a schematic structural diagram of one embodiment of a first circuit board and the first response member in the surgical instrument of the present disclosure.
Figure 24:
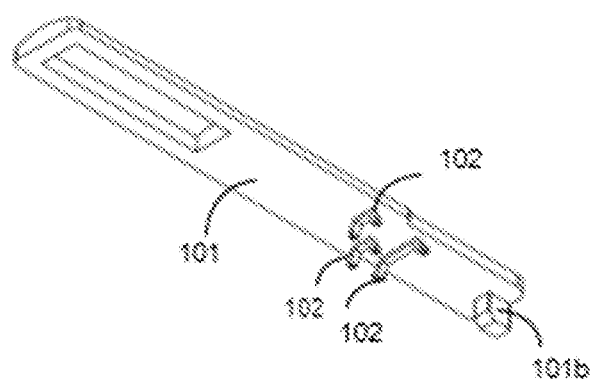
FIG. 24 is a schematic structural diagram of another embodiment of the first sliding member and the first trigger member in the surgical instrument of the present disclosure.
Figure 25:
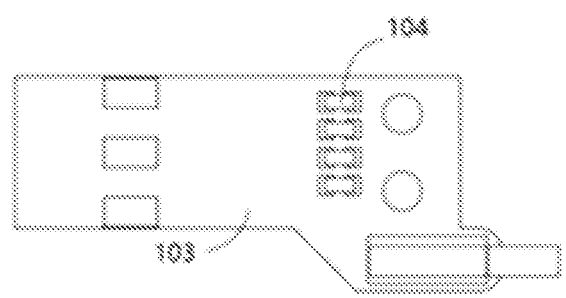
FIG. 25 is a schematic structural diagram of another embodiment of the first circuit board and the first response member in the surgical instrument of the present disclosure.
Figure 26:
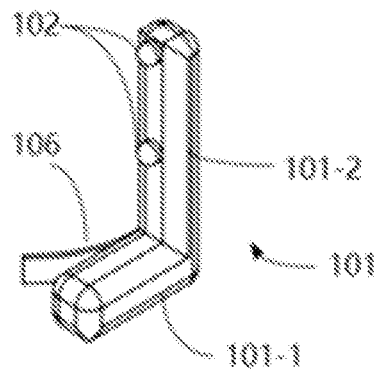
FIG. 26 is a schematic structural diagram of another embodiment of the first sliding member and the first trigger member in the surgical instrument of the present disclosure.

In one embodiment, as shown in FIG. 15, at least two first response members 104 are longitudinally spaced arranged on the first circuit board 103, the first sliding member 101 is provided with one first trigger member 102, and when the first sliding member 101 is actuated by the loading unit 200 to longitudinally move to a predetermined position, where the predetermined position depends on the corresponding type of the loading unit, the first trigger member 102 cooperates with the corresponding first response members 104, so as to provide an electrical signal corresponding to the type of the loading unit. In another embodiment, as shown in FIG. 24, at least two first trigger members 102 are longitudinally spaced arranged on the sliding member 101, at least two first response members 104 are circumferentially spaced arranged on the first circuit board 103, and when the first sliding member 101 slides to a predetermined positions in the longitudinal axis direction under the actions of the loading units 200 of different types, each first response member 104 is configured for cooperating with the corresponding first trigger member 102, so as to provide an electrical signal corresponding to the type of the loading unit. For example, a first electrical branch A1 is conducted or cut off by making the first response member 104 cooperate with the first trigger member 102, wherein a load value on each first electrical branch A1 is different.

Figure 3:
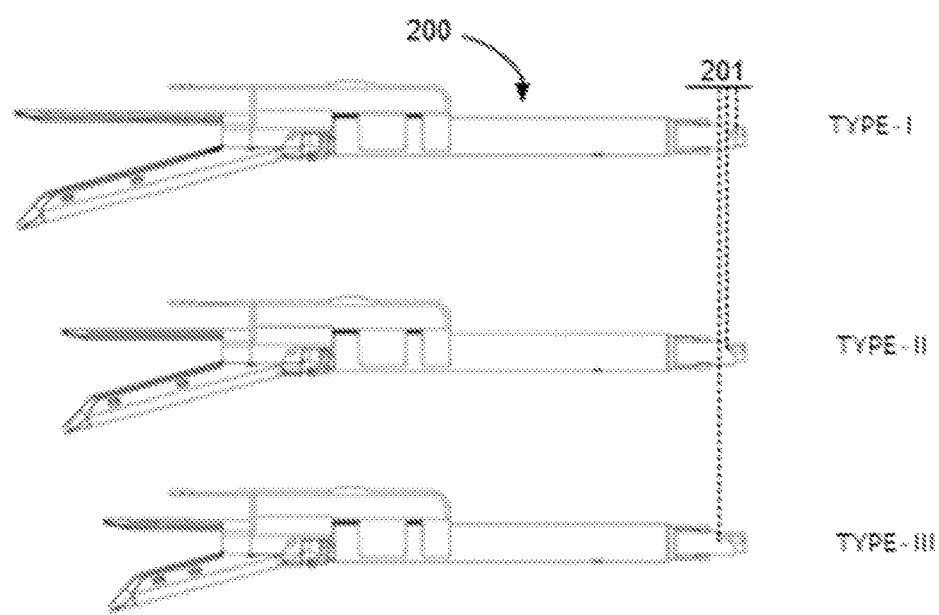
FIG. 3 is a schematic structural diagram of three loading units of different types in the surgical instrument of the present disclosure.
Figure 7:
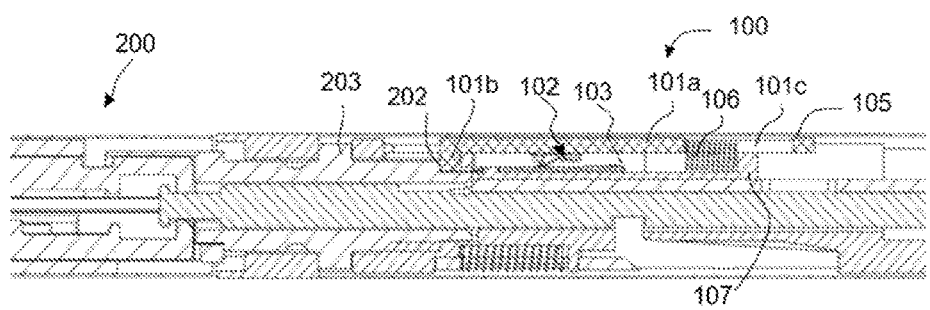
FIG. 7 is a schematic structural diagram of the recognition portion for identifying the type of the loading unit being cooperated with a type-II loading unit in the surgical instrument of the present disclosure.
Figure 8:
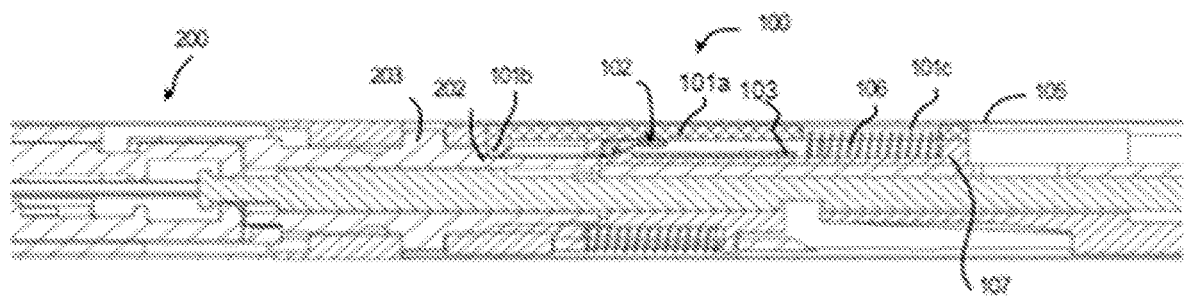
FIG. 8 is a schematic structural diagram of the recognition portion for identifying the type of the loading unit being cooperated with a type-I loading unit in the surgical instrument of the present disclosure.
Figure 9:
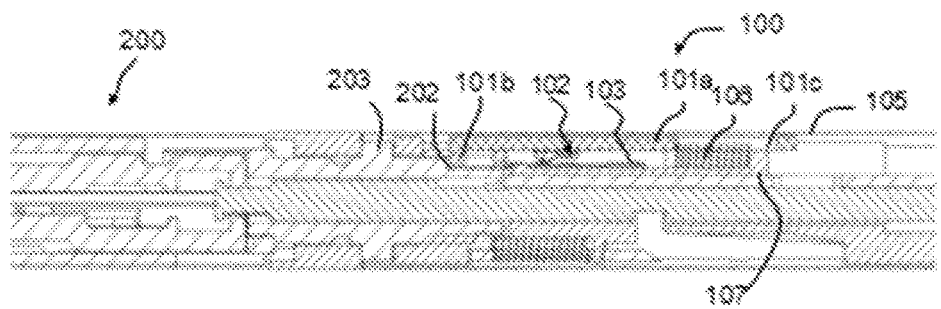
FIG. 9 is a schematic structural diagram of the recognition portion for identifying the type of the loading unit being cooperated with a type-II loading unit in the surgical instrument of the present disclosure.

FIG. 3 and FIGS. 7 to FIG. 9 show the embodiment of the recognition portion 100a above used for identifying the type of the loading unit 200, where the loading unit 200 has three different types in the present embodiment, wherein a feature portion 201 for characterizing the type of the loading unit 200 is arranged at a proximal side of the loading unit 200, the feature portion 201 is provided with a recognition action surface 202, and the recognition action surface 202 is arranged at a predetermined position of the loading units 200, wherein the predetermined position corresponds to the specific type of the loading unit 200. In this way, when the loading unit 200 is inserted into the elongated body assembly 100, the recognition action surface 202 of the feature portion 201 drives the first sliding member 101 to slide by a distance corresponding to the type of the loading unit 200. For example, as shown in FIG. 3, the recognition action surface 202 of a type-I loading unit 200 is arranged at a position nearest to a proximal end of the type-I loading unit, as shown in FIG. 8, when the type-I loading unit 200 is inserted into the elongated body assembly 100, the recognition action surface 202 pushes the first sliding member 101, thus driving the first trigger member 102 to slide to a first predetermined position, the first trigger member 102 cooperates with the first response member 104 at the distal side of the elongated body assembly 100, so that a state of the first electrical branch A1 connected with the first response member 104 is changed, the first circuit board 103 obtains a first electrical signal and sends the first electrical signal to the controller, and the controller determines that the loading unit 200 is the type-I loading unit 200 according to the first electrical signal. Similarly, the recognition action surface 202 of a type-II loading unit 200 is arranged at a position farthest away from a proximal end of the type-II loading unit, as shown in FIG. 7, when the type-II loading unit 200 is inserted into the elongated body assembly 100, the recognition action surface 202 pushes the first sliding member 101, thus driving the first trigger member 102 to slide to a second predetermined position, the first trigger member 102 cooperates with the first response member 104 at the proximal end of the elongated body assembly 100, so that a state of the first electrical branch A1 connected with the first response member 104 is changed, the first circuit board 103 obtains a second electrical signal and sends the second electrical signal to the controller, and the controller determines that the loading unit 200 is the type-II loading unit 200 according to the second electrical signal. As shown in FIG. 9, the controller may determine the type-II loading unit 200, and the recognition action surface 202 of the feature portion 201 of the type-II loading unit is arranged between a most proximal side and a most distal side.

Because the first response members 104 are spaced arranged on the first circuit board 103, during slide of the first trigger member 102, no electrical signal is output from a portion of the first trigger member located between two first response members 104, and by adjusting a load value difference between two first electrical branches A1, a wide recognition tolerance of an electrical characteristic may be achieved, thus the reliability of a recognition system is improved.

Specifically, a load of the first electrical branch A1 is not unique set, for example, a resistor, a diode, an inductor, an active load, and the like may be used; and the electrical signal output from the first circuit board 103 also has different types, for example, a voltage analog signal may be used, and frequency modulation, amplitude modulation, capacitance, inductance and other electrical signals may also be used.

Figure 10A:
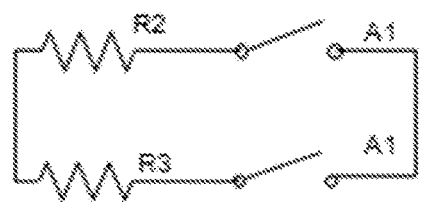
FIG. 10*a* is schematic structural diagram of a loading unit type recognition circuit in the surgical instrument of the present disclosure.
Figure 10B:
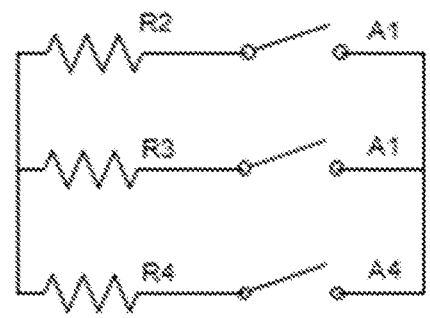
FIG. 10*b* is another schematic structural diagram of the loading unit type recognition circuit in the surgical instrument of the present disclosure.
Figure 10C:
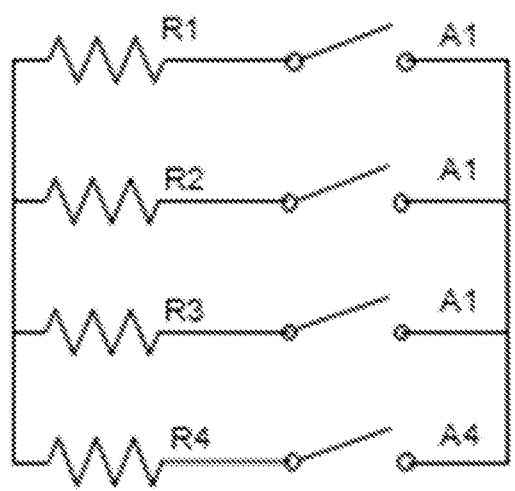
FIG. 10*c* is another schematic structural diagram of the loading unit type recognition circuit in the surgical instrument of the present disclosure.

FIGS. 10a to 10c show a loading unit type recognition circuit D1 having resistor(s) as the load. Specifically, in one embodiment, as shown in FIG. 10a, the loading unit type recognition circuit D1 is formed by connecting two first electrical branches A1 in parallel, and is configured for distinguishing two types of the loading unit 200; and in one embodiment, as shown in FIG. 10b, the loading unit type recognition circuit D1 is formed by connecting two first electrical branches A1 and a first load branch A4 in parallel, and is configured for distinguishing two types of the loading unit 200. A first load R4 is connected to the first load branch A4, so that the loading unit type recognition circuit D1 forms a normally-conducted circuit. As shown in FIG. 10c, the loading unit type recognition circuit D1 is formed by connecting three first electrical branches A1 and the first load branch A4 in parallel, and is configured for distinguishing three types the loading unit 200.

In addition, as shown in FIG. 10b, the first load R4 is connected to the first load branch A4, so that the loading unit type recognition circuit D1 forms the normally-conducted circuit for self-checking the state whether the loading unit 200 is assembled or not. For example, when the loading unit 200 is not assembled, the first load branch A4 is in a conducted state, so that the whole circuit is in a conducted state. Further, after the loading unit 200 is assembled, for example, after the type-III loading unit 200 is assembled, the recognition action surface 202 is engaged with the first sliding member 101, the first trigger member 102 continuously cooperates with the first response member 104 at the distal end thereof, and the type of the loading unit 200 is determined by the controller. When another type of the loading unit 200 is assembled, for example, when the type-I loading unit or the type-II loading unit is assembled, the recognition action surfaces 202 of the feature portions 201 can both push the first sliding member 101 to connect the corresponding first electrical branch A1 and provide the corresponding recognition electrical signal, and the type of the corresponding loading unit is determined by the controller.

Figure 11:
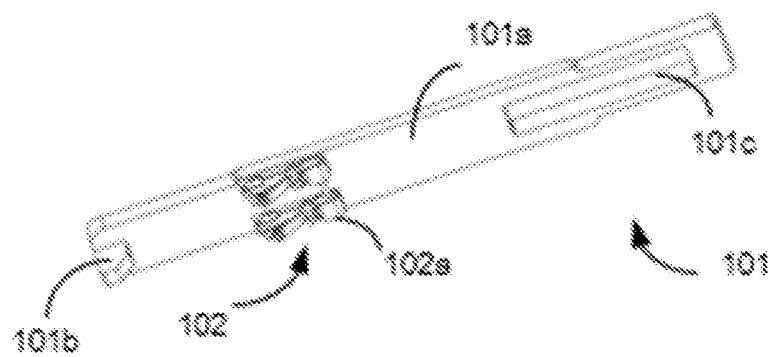
FIG. 11 is a schematic structural diagram of one embodiment of a first sliding member and a first trigger member in the surgical instrument of the present disclosure.
Figure 12:
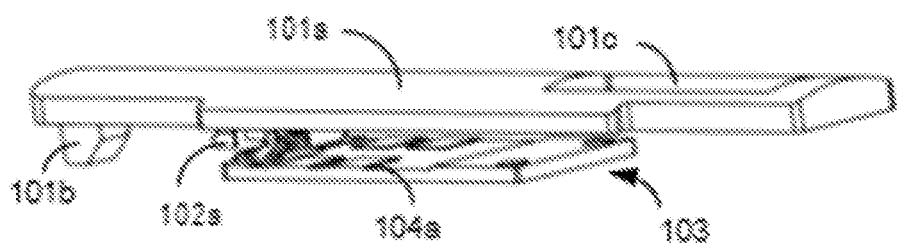
FIG. 12 is a schematic diagram of a cooperative relationship of one embodiment of the first trigger member and a first response member in the surgical instrument of the present disclosure.
Figure 14:
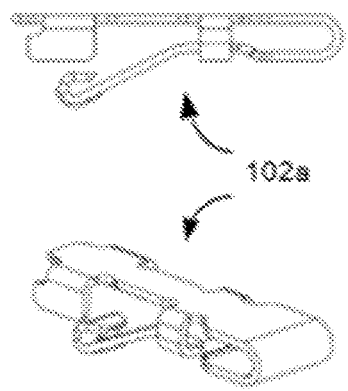
FIG. 14 is a schematic structural diagram of one embodiment of the first trigger member in the surgical instrument of the present disclosure.

In one embodiment, the first electrical branch A1 is conducted when the first trigger member 102 is engaged with the first response member 104, and the first trigger member 102 is in surface contact or line contact with the first response member 104. Since the first trigger member 102 is configured to be in surface or line contact with the first response member 104, wider range sliding is allowed through adjusting the width of the first trigger member 102 and the first response member 104, so that the reliability of the recognition system is improved. Specifically, the first response member 104 may be provided with recognition information intervals with different areas, and when a region of the first response member 104 is large, a connected area of the first response member with the first trigger member 102 is large, or the first trigger member 102 is set to have a large contact area, so as to facilitate the connection with the first response member 104. The two ways may both make the recognition tolerance of the loading unit type recognition portion 100a wide, so that the recognition accuracy is improved. As shown in FIG. 11 and FIG. 12, the first response member 104 is designed as a conductive piece 104a arranged on the first circuit board 103, the first trigger member 102 is designed as an elastic conductive sheet 102a, one end of the first trigger member 102 is engaged to the first sliding member 101, the other end of the first trigger member abuts against the first circuit board 103, and when the elastic conductive sheet 102a is actuated by the first sliding member 101 to slide to a position that is in contact with the conductive piece 104a, the first electrical branch A1 having the conductive piece 104a is conducted. More specifically, as shown in FIG. 12 and FIG. 15, the conductive piece 104a may be formed as a square sheet, which may slightly protrude or recess in the circuit board. As shown in FIG. 14, the elastic conductive sheet 102a is formed into an approximately V-shaped inserting sheet structure, and one end of the first trigger member 102 may be inserted into the first sliding member 101. Specifically, one plate surface of the first sliding member 101 is provided with an inserting slot, and one side of the V-shaped inserting sheet is inserted into the inserting slot of the first sliding member 101; and the other side of the V-shaped inserting sheet is provided with an arc-shaped protrusion protruding outwardly, and the arc-shaped protrusion portion is configured for cooperating with the conductive piece 104a to realize the line contact. In this way, a contact area with the conductive piece 104a may be adjusted by adjusting a width of the arc-shaped protrusion. More specifically, in one embodiment, a sheet-like conductive lug is connected to a surface of the arc-shaped protrusion, so that the elastic conductive sheet 102a forms the surface contact with the conductive piece 104a, and the contact area with the conductive piece 104a is adjusted by adjusting a size of the sheet-like conductive lug. In order to enlarge a contact area between the first response member 104 and the first trigger member 102, two first trigger members 102 are detachably connected to the first sliding member 101, the first trigger members 102 are spaced arranged in a sliding direction perpendicular to the first sliding member 101, two first response members 104 are arranged on the first circuit board 103 in a sliding direction perpendicular to the first sliding member 101, and the location of each first response member 104 is arranged to be corresponding to that of each first trigger member 102, so that the recognition circuit will be conducted when each of two first trigger members 102 is engaged with its corresponding first response member 104. In another embodiment, the first electrical branch A1 is cut off when the first trigger member 102 is engaged with the first response member 104, and a length of the first trigger member 102 is matched with a distance between two adjacent first response members 104, so that only the first electrical branch A1 on which one first response member 104 is located is cut off when the first trigger member moves to different positions, and other conducted first electrical branches A1 generate corresponding recognition signals.

In an alternative embodiment, the length of the first trigger member 102 is matched with the distance between two adjacent first response members 104, so that a plurality of first electrical branches A1 may be cut off at the same time when the first trigger member moves to different positions. For example, the first trigger member 102 cooperates with first and second sets of first response members 104 when moving to the first predetermined position, and two first electrical branches A1 are cut off at the same time; the first trigger member cooperates with second and third sets of first response members 104 when moving to the second predetermined position, and two first electrical branches A1 are cut off at the same time; and other branches are combined to form the recognition electric signals, and so on.

Figure 16:
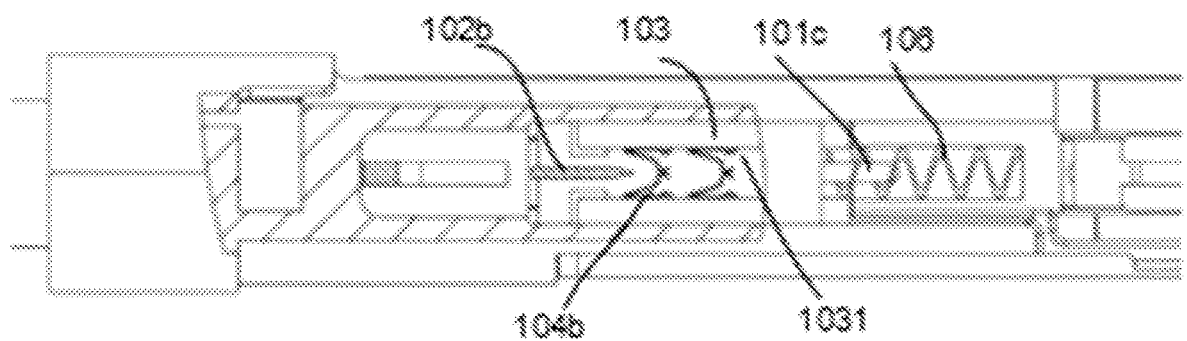
FIG. 16 is a schematic diagram of a cooperative relationship of another embodiment of the first trigger member and the first response member in the surgical instrument of the present disclosure.
Figure 17:
FIG. 17 is a schematic structural diagram of another embodiment of the first trigger member in the surgical instrument of the present disclosure.
Figure 18:
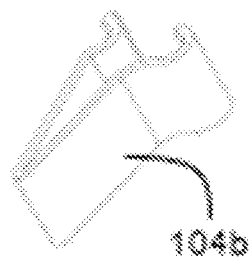
FIG. 18 is a schematic structural diagram of another embodiment of the first response member in the surgical instrument of the present disclosure.

As shown in FIGS. 16 to 18, the first response member 104 comprises two elastic conductive pieces 104b abutting against each other, and the two elastic conductive pieces 104b are electrically connected to form one first electrical branch A1; and as shown in FIG. 17, the first trigger member 102 is an insulative protrusion 102b arranged on the first sliding member 101, and when the first sliding member 101 drives the insulative protrusion 102b to slide to a position between the two elastic conductive pieces 104b, the first electrical branch A1 on which the two elastic conductive pieces 104b are located is cut off.

Specifically, as shown in FIG. 16, two limiting plates 1031 arranged in parallel are formed on the first circuit board 103 in an axial direction of the elongated body assembly 100, and the first response member 104 is mounted between the two limiting plates 1031. The elastic conductive pieces 104b may be designed in various ways. In one embodiment, the elastic conductive piece 104b is V-shaped. One side plate surface of each of two V-shaped elastic conductive pieces 104b abuts against the limiting plate 1031, and the other side plate surface of each of two V-shaped elastic conductive pieces abuts against each other to form electrical connection. In order to electrically connect the two elastic conductive pieces 104b reliably, arc-shaped protrusion portions are outwardly formed on one side plate surface of the V-shaped elastic conductive pieces 104b (shown in FIG. 18), so that the two V-shaped elastic conductive pieces 104b form more reliable line contact or surface contact. In order to make the first trigger member 102 cut off the connection between two first response members 104 smoothly, the first trigger member 102 is formed as a protrusion with a sharp corner structure at a proximal end portion (shown in FIG. 17), so that a width of the proximal end portion is narrow, the first trigger member may be easily inserted between two V-shaped elastic conductive pieces 104a, and a main body section and a sharp corner section of the first trigger member 102 transit smoothly. When the first trigger member 102 slides to the predetermined position, the main body section of the first trigger member 102 cooperates with the first response member 104, and at least a portion of the first trigger member 102 is made of a non-conductive material, so as to realize reliable cutting.

Figure 13:
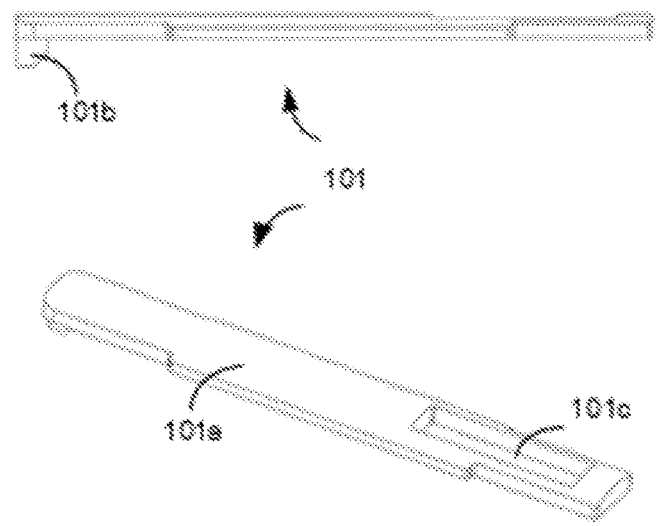
FIG. 13 is a schematic structural diagram of one embodiment of the first sliding member in the surgical instrument of the present disclosure.
Figure 22:
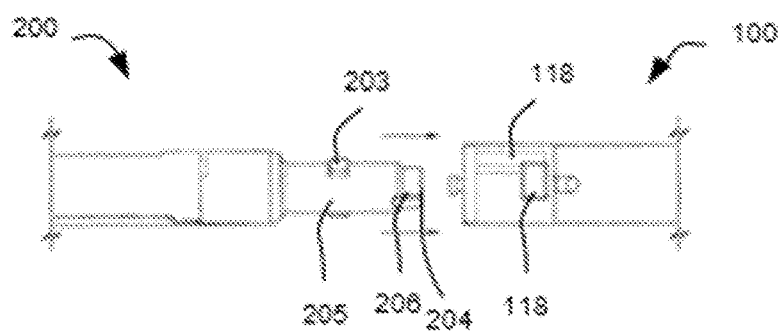
FIG. 22 is a schematic structural diagram of a connecting structure of rotating locking between the loading unit and the elongated body assembly in the surgical instrument of the present disclosure.

Specifically, as shown in FIG. 4 and FIG. 6, the elongated body assembly 100 comprises the tubular outer shell 105, and the first sliding member 101 is formed as an elongated sheet and is slidable in an axial direction of the tubular outer shell 105. In order to bias the first sliding member 101 to the proximal end of the elongated body assembly 100 without one assembled loading unit, a first biasing member 106 is arranged between the outer shell 105 of the elongated body assembly 100 and the first sliding member 101, and the first biasing member 106 applies a force towards the distal end to the first sliding member 101. In this way, the first sliding member 101 is biased in an initial state that is to be approached to the distal end of the elongated body assembly 100 under an action of the first biasing member 106. Further in one embodiment, as shown in FIG. 13, in order to enhance a pushing action between the first sliding member 101 and the recognition action surface 202 of the loading unit 200, a protrusion 101b is axially arranged at the proximal end of the first sliding member 101, a reset hole 101c is longitudinally arranged on the first sliding member 101, and the first biasing member 106 is arranged between the outer shell 105 and the reset hole 101c. Specifically, as shown in FIG. 6, a frame 107 is arranged in the outer shell 105 of the elongated body assembly 100, a sliding groove is arranged on the frame 107, the first circuit board 103 is fixedly connected to a bottom portion of the sliding groove, the first sliding member 101 is slidably connected to a side wall of the sliding groove, and the first biasing member 106 is located between a proximal end of the sliding groove and the proximal end of the first sliding member 101. In the surgical instrument in the embodiment above, as shown in FIG. 22, the proximal end of the loading unit 200 further comprises a connection structure for being connected with the elongated body assembly 100; and comprises a first inserting section 205 and a second inserting section 206 which are sequentially connected from the distal end to the proximal end. An outer diameter of the first inserting section 205 is larger than that of the second inserting section 206, the first inserting section 205 is provided with an engagement nub 203 for releasably engaging the distal end of the elongated body assembly 100 in a bayonet type fashion with. The second inserting section 206 is configured as the recognition feature portion 201. Different type of the loading unit 200 may have different length of the second inserting sections 206, a step between the first inserting section 205 and the second inserting section 206 abuts against the first sliding member 101, and the step is configured as the recognition action surface 202.

FIGS. 26 to 30 show the embodiment of the surgical instrument in which the type of the loading unit is recognized during the engagement of the loading unit 200 in bayonet type fashion. The first sliding member 101 adapted for cooperating with the loading unit 200 is circumferentially slidably arranged on the inner side of the outer shell 105 of the elongated body assembly 100. More specifically, the first sliding member 101 is slidably arranged on the frame 107 that is on the inner side of the outer shell 105 of the elongated body assembly 100, and the first sliding member 101 is slidable in a circumferential tangential direction of the elongated body assembly 100 (that is, in a circumferential direction of the elongated body assembly 100 and in a direction perpendicular to the longitudinal axis). Alternatively, the first sliding member 101 is slidably arranged in the outer shell 105 of the elongated body assembly 100, and the first sliding member 101 is slidable in a circumferential direction of an inner wall of the outer shell 105 of the elongated body assembly 100. Different type of the loading unit 200 actuates the first sliding member 101 to move to the different corresponding predetermined position, during the rotation thereof, so as to actuate the first trigger member 102 to slide to different predetermined position, thus the type information of the assembled loading unit 200 may be identified during the assemble and rotation thereof.

Figure 27:
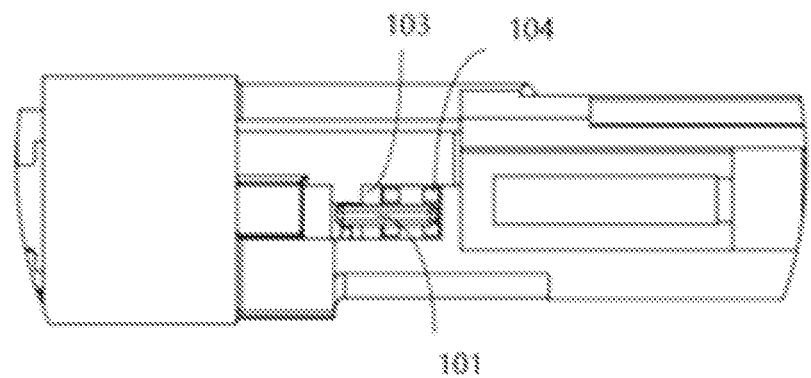
FIG. 27 is a schematic diagram of a cooperative relationship between the first sliding and the first circuit board in another embodiment of the surgical instrument of the present disclosure.
Figure 28:
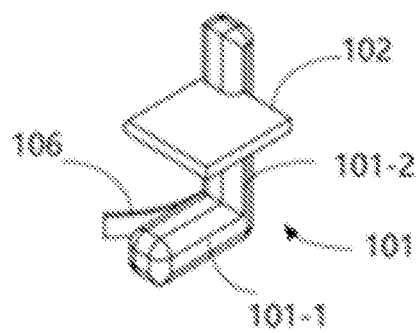
FIG. 28 is a schematic structural diagram of another embodiment of the first sliding member and the first trigger member in the surgical instrument of the present disclosure.

Specifically, as shown in FIGS. 26 to 29, at least two first response members 104 are spaced arranged on the first circuit board 103 in the circumferential tangential direction of the elongated body assembly 100, wherein the first sliding member 101 is formed as an L-shaped slider, and the L-shaped slider comprises a first supporting arm 101-1 and a second supporting arm 101-2, wherein the first supporting arm 101-1 is configured for cooperating with the loading unit, and the second supporting arm 101-2 is provided with the first trigger member 102. The first sliding member 101 may be actuated by various types of the loading units 200, so as to be moved to different corresponding predetermined positions in the circumferential tangential direction of the elongated body assembly 100, the corresponding first response member 104 is engaged with the first trigger member 102 to provide the electrical signal that may represent the type of the loading unit. For example, the first electrical branch A1 is conducted or cut off through the engagement between the first response member 104 and the first trigger member 102, wherein each of the first electrical branches A1 may have different load value. FIG. 27 shows a schematic structural diagram of conducting the first electrical branch A1 through the cooperation of the first response member 104 and the first trigger member 102. FIG. 29a and FIG. 29b show schematic structural diagrams of cutting off the first electrical branch A1 through the cooperation of the first response member 104 and the first trigger member 102. In this embodiment, sliding direction of the first sliding member 101 is different from the other embodiments, while ways of conducting and cutting off the circuit are similar to those in the embodiment of the surgical instrument in which the first sliding member 101 slides in the axial direction, which will not be repeated herein.

Figure 29A:
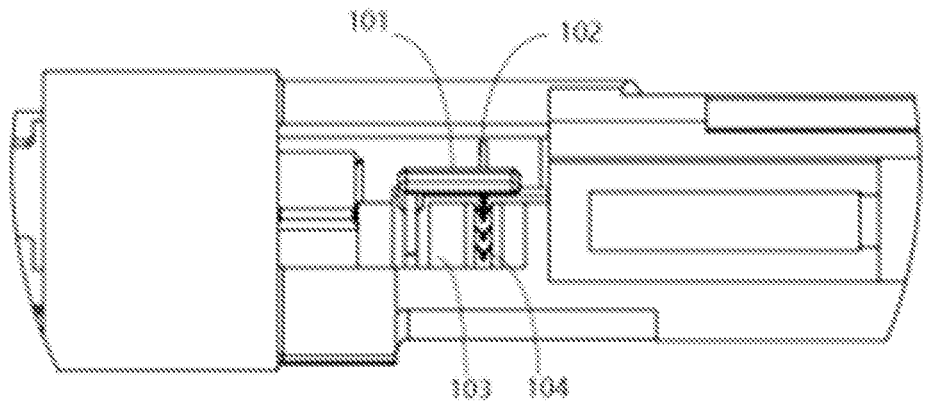
FIG. 29a is a schematic diagram of cooperation between the first sliding member and the first circuit board in an initial state in another embodiment of the surgical instrument of the present disclosure.
Figure 29B:
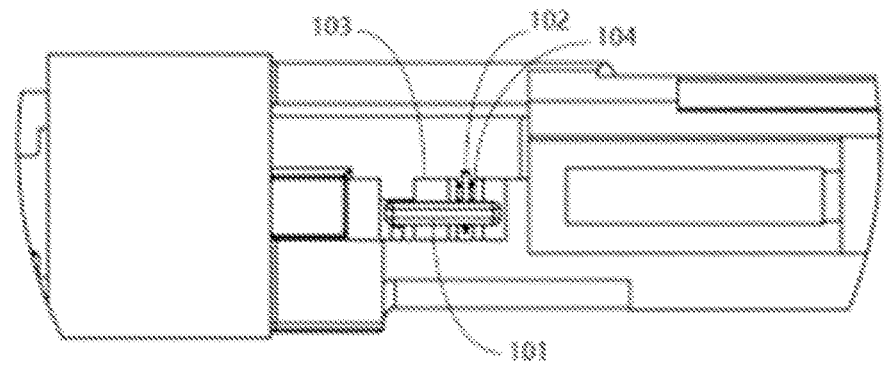
FIG. 29b is a schematic diagram of cooperation between the first sliding member and the first circuit board after the loading unit is assembled in another embodiment of the surgical instrument of the present disclosure.
Figure 30:
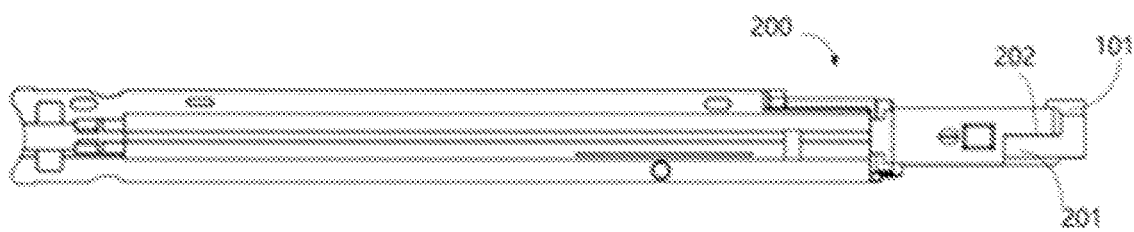
FIG. 30 is a schematic structural diagram of the loading unit in another embodiment of the surgical instrument of the present disclosure.

As shown in FIG. 27, FIG. 29a, and FIG. 29b, the first sliding member 101 is slidably arranged on the frame 107 that is arranged in the elongated body assembly 100, in addition, the first biasing member 106 is arranged between the first sliding member 101 and the frame 107, and the first biasing member 106 applies a force in the circumferential tangential direction of the elongated body assembly 100 and in a direction far away from the first circuit board 103 on the first sliding member 101. In this way, the first sliding member 101 is biased to slide distally from the first circuit board 103 so as to be in an initial state under the action of the first biasing member 106. During the engagement of the loading unit 200 to the elongated body assembly 100, the first sliding member 101 overcomes the action of the first biasing member 106 under an action of the recognition action surface 202 of the loading unit 200, so that the first trigger member 102 is engaged with the first response member 104. In the surgical instrument of this embodiment, as shown in FIG. 30, a notch structure is arranged at the proximal end of the loading unit 200 so as to be configured as the feature portion 201, and when the loading unit 200 is engaged with the elongated body assembly 100, the first supporting arm 101-1 of the first sliding member 101 is inserted into the notch. A notch arm of the notch extends in the axial direction to form the recognition action surface 202 for cooperating with the first supporting arm 101-1 of the first sliding member 101. In addition, the surgical instrument of one of the above-mentioned embodiments further comprises a recognition mechanism for determining whether the loading unit is well assembled or not, and the loading unit may be actuated only after the loading unit is determined to be well assembled, so that medical accidents due to mis-assemble of the loading unit will be avoided.

Specifically, as shown in FIG. 4, the determine mechanism for determining whether the loading unit is well assembled, which further comprises a determine portion 100b, which is arranged in the elongated body assembly 100, and whether the loading unit 200 is well assembled may be determined based on judgment of the determine portion 100b, so as to determine whether to proceed with further surgical operations. In an alternative embodiment, the determine portion 100b may also be arranged in the rotating knob assembly 400 or the handle portion 300. The embodiment of the loading unit determine portion 100b is introduced hereinafter.

FIG. 4 shows the embodiment of the loading unit determine portion 100b, which comprises: a second sliding member 108 and a third sliding member 109 which are slidably arranged in the outer shell 105 of the elongated body assembly 100 respectively, wherein the second sliding member 108 is configured for cooperating with the engagement nub 203 of the loading unit 200, while the third sliding member 109 is configured for cooperating with a proximal end-face 204 of the loading unit 200, and when the loading unit 200 is well inserted and rotated, the second sliding member 108 slides to different set positions and the third sliding member 109 slides to the same set position; a second trigger member 110 and a third trigger member 111, wherein the second trigger member 110 is connected with the second sliding member 108, and the third trigger member 111 is connected with the third sliding member 109; and a second circuit board 112 is fixedly arranged in the outer shell 105 of the elongated body assembly 100, wherein the second circuit board 112 is provided with a second response member 113 and a third response member 114, the second response member 113 is configured for cooperating with the second trigger member 110 to switch a second electrical branch A2 between a first state and a second state, and the third response member 114 is configured for cooperating with the third trigger member 111 to switch a third electrical branch A3 between a third state and a fourth state. Corresponding to positions at which the loading unit 200 is inserted in place and rotated in place, the second circuit board 112 outputs two signals indicating different states. The controller is configured to determine whether the loading unit 200 is well assembled to the elongated body assembly 100 according to a feedback signal from the second circuit board 112. Specifically, the first state and the second state of the second electrical branch A2 refer to two circuit states with different output signals, for example, the first state may be a conducted state of the electrical branch and the second state may be a unconducted or cut-off state of the electrical branch. Alternatively, the first state may be an electrical branch with a load of L1, which outputs a signal of V1; and the second state may be an electrical branch with a load of L2, which outputs a signal of V2. Similarly, the third state and the fourth state of the third electrical branch A3 refer to two circuit states with different output signals, which will not be repeated herein.

The loading unit 200 is attached to the elongated body assembly 100 in a bayonet fashion. Specifically, as shown in FIG. 22, the engagement nub 203 of the loading unit 200 is configured as a locking protrusion arranged at an end portion of the loading unit 200, a locking sliding groove 118 is arranged inside the outer shell 105 of the elongated body assembly 100, and the locking protrusion is received within the locking sliding groove 118 to prevent the loading unit 200 from rotation.

Figure 19:
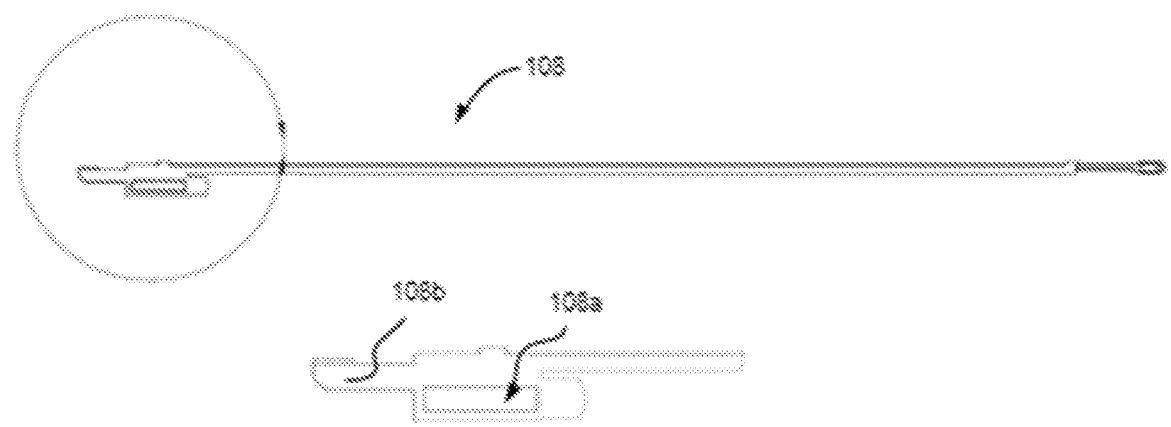
FIG. 19 is a schematic structural diagram of one embodiment of a second sliding member in the surgical instrument of the present disclosure.
Figure 23A:
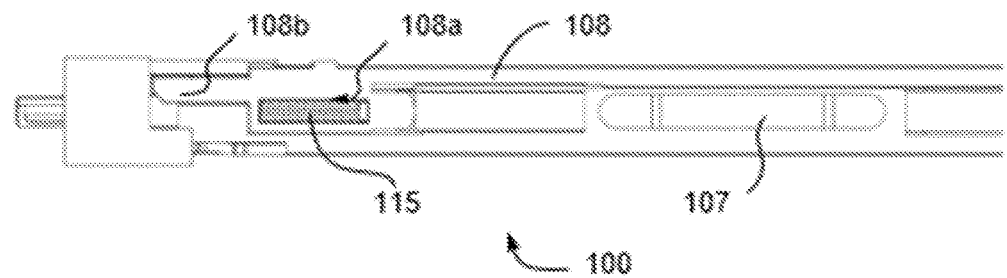
FIG. 23*a* is a schematic diagram of the elongated body assembly without the loading unit in the surgical instrument of the present disclosure.
Figure 23B:
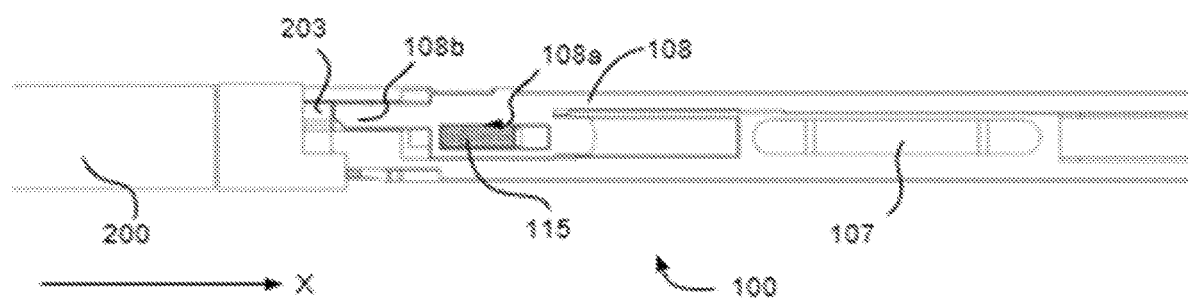
FIG. 23*b* is a schematic diagram of the elongated body assembly inserted with the loading unit in the surgical instrument of the present disclosure.
Figure 23C:
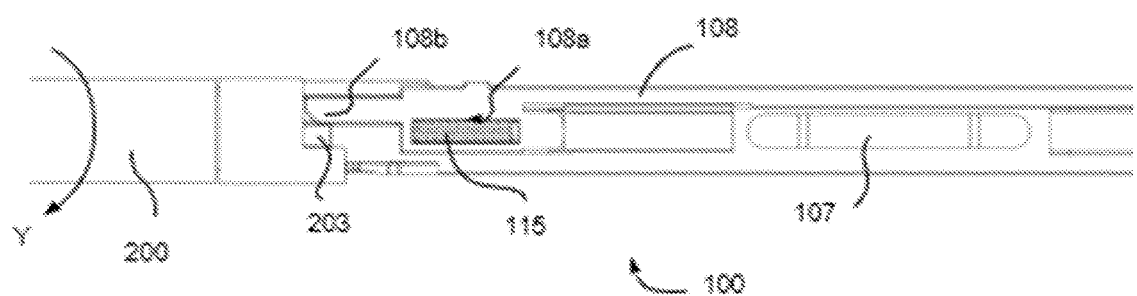
FIG. 23*c* is a schematic diagram of the loading unit rotated in place in the surgical instrument of the present disclosure.

More specifically, as shown in FIG. 19 and FIG. 23a, the second sliding member 108 is slidably arranged on the frame 107 in the elongated body assembly 100, a locking portion 108b and a reset hole 108a are arranged at a distal end of the second sliding member 108, the resetting member 115 is arranged between the reset hole 108a and the outer shell 105 of the elongated body assembly 100, and the resetting member 115 may be a biasing member such as a spring, an elastic sheet or a reed. As shown in FIG. 23b, the loading unit 200 is inserted into the elongated body assembly 100 along an X direction, and the engagement nub 203 of the loading unit 200 pushes the second sliding member 108 to move towards a near side, so that the engagement nub 203 is located at a corner of the locking sliding groove 118. As shown in FIG. 23c, the loading unit 200 is rotated along a Y direction, the engagement nub 203 moves to give way to the second sliding member 108, the second sliding member 108 is reset under a biasing force of the resetting member 115, and the engagement nub 203 is locked in the elongated body assembly 100 under limitation of the second sliding member 108 and the locking portion of the locking sliding groove 118.

Because the loading unit 200 is attached to the elongated body assembly 100 in a bayonet fashion, which is the loading unit 200 is assembled to the elongated body assembly 100 by rotating after being inserted in place, so that the loading unit 200 has a position where it is inserted in place and a position where it is rotated in place. When the loading unit is in the inserted in place position, the engagement nub 203 of the loading unit 200 pushes the second sliding member 108 to move to the position where the second sliding member cooperates with the second response member 113, so that the state of the second electrical branch A2 is changed, for example, being changed from the unconducted state to the conducted state, and the proximal end-face 204 of the loading unit 200 pushes the third sliding member 109 to move to the position where the third sliding member cooperates with the third response member 114, so that the state of the third electrical branch A3 is changed, for example being changed from the conducted state to the unconducted state or the loaded state. At the moment, the second circuit board 112 outputs a first signal, for example, the second electrical branch A2 is in a state of "1" and the third electrical branch A3 is in a state of "0". When the loading unit is in the position where it is rotated in place, because the engagement nub 203 of the loading unit 200 is rotated, the loading unit is disengaged from the second sliding member 108. At the moment, the second sliding member 108 moves to a position where the second sliding member does not cooperate with the second response member 113, so that the state of the second electrical branch A2 is changed, for example, being changed from the conducted state to the unconducted state or the loaded state, while an axial position of the proximal end-face 204 of the loading unit 200 remains unchanged during rotation, thus remaining the cooperation with the second response member 113, and the state of the third electrical branch A3 remains unchanged. At the moment, the second circuit board 112 outputs a second signal, for example, the second electrical branch A2 is in the state of "0" and the third electrical branch A3 is in the state of "0". The controller may judge whether the loading unit 200 is well assembled according to the electrical signal output by the second circuit board 112.

In addition, because of the second biasing member 115, when the loading unit 200 is in the rotated-in-place position, the second trigger member 110 and the second response member 113 can be reliably disengaged, and the second biasing member 115 applies a force towards the distal end to the second sliding member 108. When the loading unit 200 is in inserted-in-place position, the engagement nub 203 of the loading unit 200 abuts against the second sliding member 108, and the second trigger member 110 triggers the second response member 113 to make the second electrical branch A2 in the first state; and when the loading unit 200 is in rotated-in-place position, the second sliding member 108 moves to a distal end of the elongated body assembly 100 under an action of the second biasing member 115, and the second trigger member 110 is disengaged from the second response member 113 to make the second electrical branch A2 in the second state.

Specifically, in order to distinguish a position at which the loading unit 200 is not inserted from the positions at which the loading unit is inserted in place and rotated in place, that is, after the loading unit 200 is released from the elongated body assembly, the loading unit determine portion can be effectively reset. In one embodiment, a third biasing member 116 is arranged between the third sliding member 109 and the outer shell 105 of the elongated body assembly 100, which bias the third sliding member 109 distally. When the loading unit 200 is in the inserted-in-place position as well as the rotated-in-place position, the third trigger member 111 triggers the third response member 114 to switch the third electrical branch A3 into the first state; and when the loading unit 200 is in the position where it is not inserted in place, the third sliding member 116 moves to a distal end of the elongated body assembly 100 under an action of the third biasing member 109, and the third trigger member 111 is disengaged from the third response member 114 to switch the third electrical branch A3 into the second state. In this way, when the loading unit 200 is in the position where it is not inserted, the position where it is inserted in place and the position where it is rotated in place, the second circuit board 112 can output different corresponding signals, so that the controller determines whether the loading unit is well assembled.

The cooperation between the second trigger member 110 and the second response member 113 and the cooperation between the third trigger member 111 and the third response member 114 are not unique, which will be described hereinafter in below embodiments.

In one embodiment, the second response member 113 and the third response member 114 are configured as electrical switches, and the second trigger member 110 and the third trigger member 111 switch the electrical switches to change the on and off states, thus changing the states of the second electrical branch A2 and the third electrical branch A3. More specifically, the second response member 113 is configured as a first electrical switch. When the second trigger member 110 slides to a position at which the second trigger member abuts against the second response member 113, a state of the first electric switch is switched (for example, being switched from the conducted state to the unconducted state or the loaded state), so that the second electric branch A2 is in the first state; and when the second trigger member 110 slides to a position at which the second trigger member is separated from the second response member 113, the state of the first electrical switch is switched (such as being switched from the unconducted state or the loaded state to the conducted state), so that the second electrical branch A2 is in the second state. When the third trigger member 111 slides to a position at which the third trigger member abuts against the third response member 114, a state of the second electrical switch is switched (such as being switched from the conducted state to the unconducted state or the loaded state), so as to switch the third electrical branch A3 into the third state; and when the third trigger member 111 slides to a position at which the third trigger member is disengaged from the third response member 114, the state of the second electrical switch is switched (for example, being switched from the conducted state to the unconducted state or the loaded state), so as to switch the third electrical branch A3 into the fourth state. More specifically, the electrical switch is configured as a push-type electrical switch, when the second trigger member 110 or the third trigger member 111 slides to a position of the push-type electrical switch, a state of the electrical switch is changed by pushing, and when the second trigger member or the third trigger member is released from the position of the push-type electrical switch, the state of the electrical switch is changed again.

Alternatively, in another embodiment, the second response member 113/third response member 114 is configured as an electrical contact, and the second trigger member 110 cooperates with the second response member 113 to form a switch for conducting or cutting off/loading the second electrical branch A2; and the third trigger member 111 cooperates with the third response member 114 to form a switch for conducting or cutting off/loading the second electrical branch A2. More specifically, when the second trigger member 110 slides to the position at which the second trigger member abuts against the second response member 113, the second trigger member 110 and the electrical contact conduct the second electrical branch A2; and when the second trigger member 110 slides to the position at which the second trigger member is disengaged from the second response 113, the second electrical branch A2 is switched to be in the unconducted state or the loaded state. When the third trigger member 111 slides to the position at which the third trigger member abuts against the third response member 114, the third trigger member 111 and the electrical contact conduct the third electrical branch A3; and when the third trigger member 111 slides to the position at which the third trigger member is disengaged from the third response member 114, the third electrical branch A3 is disconnected/switched to be in the unconducted state or the loaded state.

Structures of detection circuits of the loading unit type recognition portion 100a and the loading unit determine portion 100b are not unique. In one embodiment, a plurality of first electrical branches A1 are connected in parallel to form the loading unit type recognition circuit D1; and the second electrical branch A2 and the third electrical branch A3 are connected in parallel to form the loading unit well-assembled recognition circuit D2. The loading unit type recognition circuit D1 and the loading unit well-assembled recognition circuit D2 are set independently from each other, and are electrically connected to the controller respectively.

In order to simplify the detection circuits of the loading unit type recognition portion 100a and the loading unit determine portion 100b, in another embodiment, a plurality of first electrical branches A1 are connected in parallel to form the loading unit type recognition circuit D1, and the second electrical branch A2 and the third electrical branch A3 are connected in series to form the loading unit well-assembled recognition circuit D2. The loading unit type recognition circuit D1 and the loading unit well-assembled recognition circuit D2 are connected in series to the controller to form an electrical loop. More specifically, the loading unit type recognition circuit D1 further comprises a first load branch A4 connected in parallel with the first electric branch A1. In the loading unit well-assembled recognition circuit D2, the first state and the second state of the second electrical branch A2 correspond to two electrical branches with different load values, and the third state and the fourth state of the third electrical branch A3 correspond to connecting the electrical branch and disconnecting or changing (increase of the load) the electrical branch. When the loading unit 200 is in the position where it is not inserted in place and the position where it is rotated in place, the loading unit type recognition circuit D1 and the loading unit well-assembled recognition circuit D2 are in the conducted state, and the load values in the two states are different, and the controller determines the state of the loading unit 200 according to the load value of the whole circuit. When the loading unit 200 is in the inserted-in-place position, the loading unit type recognition circuit D1 and the loading unit well-assembled recognition circuit D2 are in the unconducted state or the loaded state.

Figure 21A:
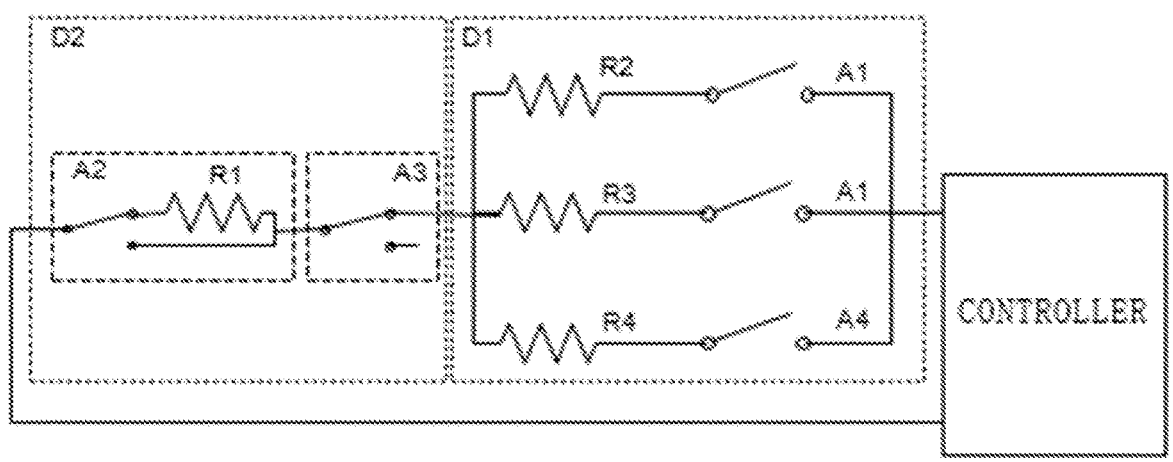
FIG. 21*a* shows a connection state of one embodiment of the loading unit type recognition circuit and the loading unit in-place mounting recognition circuit when the loading unit is not inserted according to the present disclosure.
Figure 21B:
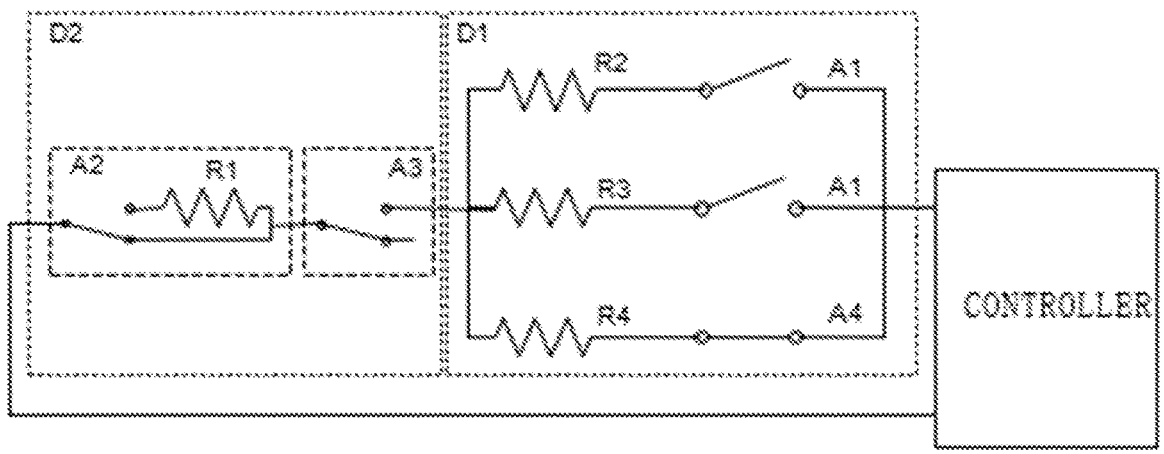
FIG. 21*b* shows a connection state of one embodiment of the loading unit type recognition circuit and the loading unit in-place mounting recognition circuit when the loading unit is inserted in place according to the present disclosure.
Figure 21C:
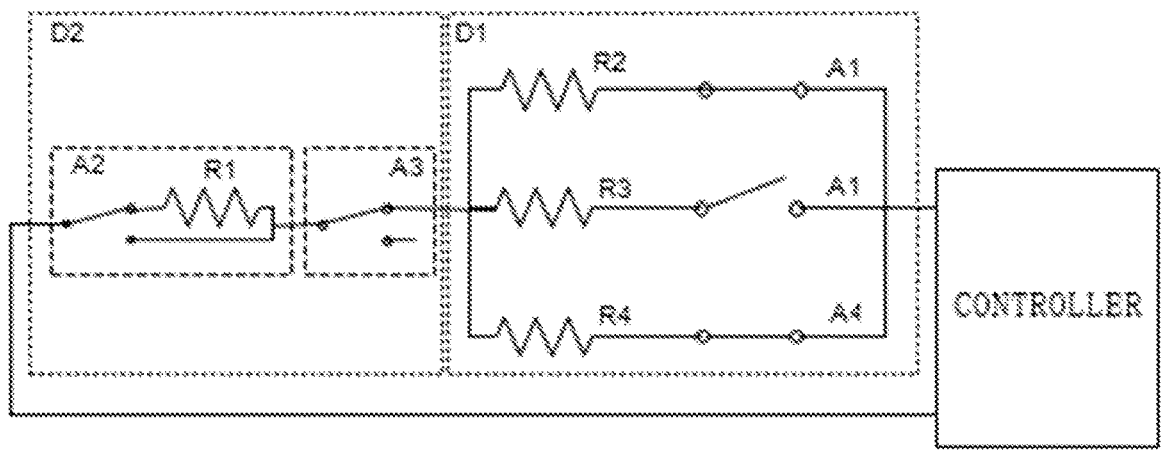
FIG. 21*c* shows a connection state of one embodiment of the loading unit type recognition circuit and the loading unit in-place mounting recognition circuit when the loading unit is rotated in place according to the present disclosure.

Specifically, FIG. 21a to FIG. 21c show one embodiment in which the loading unit type recognition circuit D1 and the loading unit well-assembled recognition circuit D2 are connected in series, wherein in the second electrical branch A2, a load value in the first state is R1 and a load value in the second state is 0; and in the third electrical branch A3, the third state is the conducted state and the fourth state is the unconducted state. The loading unit type recognition circuit D1 comprises two first electrical branches A1 connected in parallel and one first load branch A4 with a load value of R4.

As shown in FIG. 21a, when the loading unit 200 is in the position where it is not inserted, the second electrical branch A2 is in the first state, the third electrical branch A3 is in the third state, and the loading unit type recognition circuit D1 is in the conducted state through the first load branch A4. Therefore, the whole electrical loop is in the conducted state, and based on the load R1 of the second electrical branch A2 and the load R4 of the first load branch A4, the output electrical signal is A1.

As shown in FIG. 21b, when the loading unit 200 is in inserted-in-place position, the second electrical branch A2 is switched to the second state, and the third electrical branch A3 is switched to the fourth state, so that the whole electrical loop is in the unconducted state, and the controller cannot receive the electrical signal.

As shown in FIG. 21c, when the loading unit 200 is in the rotated-in-place position, the second electrical branch A2 is switched to the first state again, and the third electrical branch A3 is switched to the third state. In the loading unit type recognition circuit D1, one first electrical branch A1 is conducted, for example, the first electrical branch A1 with a load of R2 is conducted, the whole electrical loop is in the conducted state, and based on the load R1 of the second electrical branch A2, the load R2 of the first electrical branch A1 and the load R4 of the first load branch A4, the output electrical signal is A2.

Figure 31:
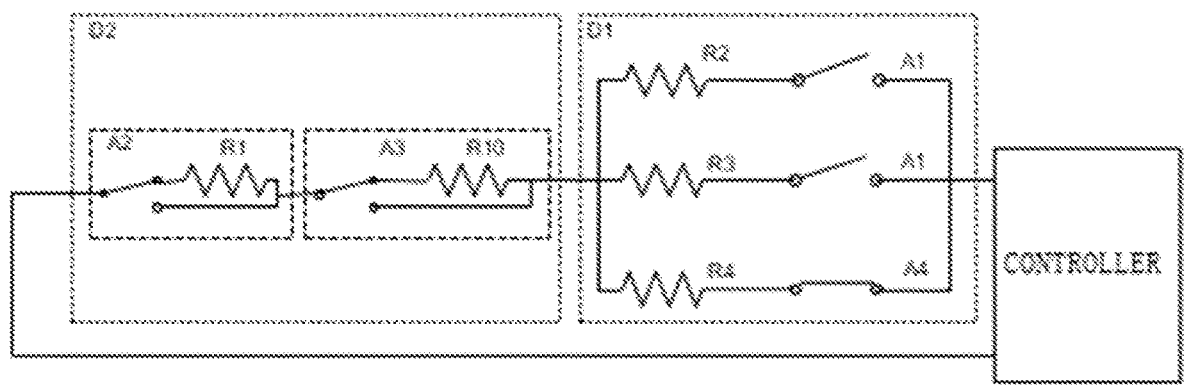
FIG. 31 is a schematic diagram of a connection relationship of one embodiment of the loading unit type recognition circuit and the loading unit in-place mounting recognition circuit in the present disclosure.

FIG. 31 shows another embodiment in which the loading unit type recognition circuit D1 and the loading unit well-assembled recognition circuit D2 are connected in series, wherein in the second electrical branch A2, a load value in the first state is R1 and a load value in the second state is "0"; and in the third electrical branch A3, a load value in the third state is R10 and a load value in the fourth state is "0". The loading unit type recognition circuit D1 comprises two first electrical branches A1 connected in parallel and one first load branch A4 with a load value of R4. By adopting the circuit above in this embodiment, the whole circuit may be always in the conducted state, and various indicating signals are formed by changing load values of corresponding circuits, providing good indication accuracy.

Specifically, when the loading unit 200 is in the position where it is not inserted, the second electrical branch A2 is in the first state, the third electrical branch A3 is in the third state, and the loading unit type recognition circuit D1 is in the conducted state through the first load branch A4. Therefore, the whole electrical loop is in the conducted state, and based on the load R1 of the second electrical branch A2, the load R10 of the third electrical branch A3 and the load R4 of the first load branch A4, the output electrical signal is A1'.

When the loading unit 200 is in inserted-in-place position, the second electrical branch A2 is switched to the second state, and the third electrical branch A3 is switched to the fourth state. In the loading unit type recognition circuit D1, one first electrical branch A1 is connected, for example, the first electrical branch A1 with a load of R2 is connected, the whole electrical loop is in the conducted state, the whole electrical loop is in the conducted state, and based on the load 0 of the second electrical branch A2, the load 0 of the third electrical branch A3 and the load RX of the first load branch A4, the output electrical signal is A2'.

When the loading unit 200 is in rotated-in-place position, the second electrical branch A2 is switched back to the first state, and the third electrical branch A3 is switched to the third state. The loading unit type recognition circuit D1 remains in the conducted state, and based on the load R1 of the second electrical branch A2, the load R2 of the first electrical branch A1 and the load RX of the first load branch A4, the output electrical signal is A3'.

In the above mentioned embodiment, when the loading unit 200 is not inserted, the loading unit type recognition circuit D1 and the loading unit well-assembled recognition circuit D2 are in the conducted state, so that the surgical instrument is in a self-checking state. When the loading unit 200 is well assembled, the loading unit type recognition circuit D1 and the loading unit well-assembled recognition circuit D2 are in the conducted state, with an output signal different from that when the loading unit is not inserted. The controller determines that the loading unit 200 is well assembled and the type of the loading unit 200 can be recognized according to the signal.

Figure 20:
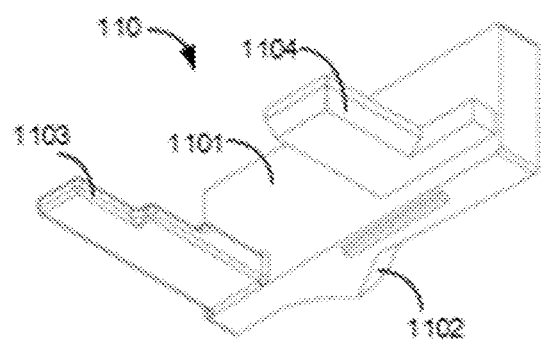
FIG. 20 is a schematic structural diagram of one embodiment of a second trigger member in the surgical instrument of the present disclosure.

Specifically, the connection between the second sliding member 108 and the second trigger member 110 is not unique. In one embodiment, the second sliding member is in ridged connection and the second trigger member in inserting manner, wherein the second sliding member 108 is formed as an elongated rod, an inserting hole is arranged at a proximal end portion of the second sliding member, and an inserting rod inserted into the inserting hole is arranged on the second trigger member 110. More specifically, the outer shell 105 of the elongated body assembly 100 is provided with an opening, and the second trigger member 110 penetrates through the opening. As shown in FIG. 20, the second trigger member 110 comprises a triggering body 1101, a slider 1102, the inserting rod 1103 and a triggering rod 1104, wherein the triggering body 1101 is fixedly connected with the outer shell 105 of the elongated body assembly 100, a slideway is arranged on the triggering body 1101, and the slider 1102 is slidably connected to the triggering body 1101 along the slideway and located at an outer side of the outer shell 105 of the elongated body assembly 100. The inserting rod 1103 is connected to a distal end of the slider 1102 and configured for being connected with the second sliding member 108 by inserting. The triggering rod 1104 is connected to a proximal end of the slider 1102 and configured for triggering the second response member 113. More specifically, the triggering rod 1104 is provided with a protrusion portion for pressing the second response member 113 during sliding.

Specifically, the connection between the third sliding member 109 and the third trigger member 111 is not unique. In one embodiment, the third sliding member 109 is formed into an elongated tube, which is directly connected with the third trigging member 111 located at the proximal end of the elongated body assembly 100. In another embodiment, as shown in FIG. 4, the third sliding member 109 is formed and connected with the third trigger member 111 through an intermediate connecting member 117. More specifically, the third sliding member 109 is formed into an elongated sheet and located at the distal end of the elongated body assembly 100, the intermediate connecting member 117 is formed into a sleeve which penetrates through the hollow frame 107, and the third trigger member 111 is formed into a block and located at the proximal end of the elongated body assembly 100. The third trigger member 111 is provided with a protrusion portion for pressing the third response member 114 during sliding.

Specifically, the surgical instrument further comprises an indicating unit, wherein the indicating unit is configured for indicating the type of the loading unit 200. After the controller determines the type of the loading unit 200 according to the electrical signal provided by the first circuit board 103, the indicating unit is controlled to give an indication, indicating a user the surgical instrument of the type of the current assembled loading unit 200. The indicating unit is also configured for indicating if the loading unit 200 is well assembled, and the controller makes the indicating unit send out a second indicating signal that the loading unit 200 is well assembled according to the feedback signal from the second circuit board 112.

Specific indicating method and implementation structure of the indication unit are not unique, sound indication, mechanical indication, indicator light indication or text indication may be adopted. Accordingly, the indicating unit may be implemented by hardware structures such as a buzzer, a protrusion/recession indicator, a light emitting diode or a display screen. In addition, the indicating unit may be mounted on the handle portion 300 of the surgical instrument to facilitate the user to receive the indicating signal.

Obviously, the above embodiments are only examples for clearly illustrating the present disclosure, but are not intended to limit the implementations of the present disclosure. For those of ordinary skills in the art, other different forms of changes or variations may be made on the basis of the above description. It is not necessary or possible to exhaust all the implementations herein. Moreover, the obvious changes or variations derived from this are still included within the scope of protection of the present disclosure.

What is claimed is:

1. A surgical instrument comprising a handle assembly adapted for being attached with a loading unit, wherein the loading unit may have various types, and the handle assembly comprising a handle portion and an elongated body assembly, wherein the elongated body assembly is provided with a recognition portion for identifying the type of the loading unit, the surgical instrument comprising:
   a first sliding member slidably arranged in an outer shell of the elongated body assembly, wherein the first sliding member is configured for being actuated by the loading unit during assembling of the loading unit, so as to be moved to a predetermined position;
   a first trigger member arranged on the first sliding member, adapted for being moved to the predetermined position along with the first sliding member;
   a first circuit board arranged in the outer shell of the elongated body assembly, wherein at least two first response members are spaced arranged on the first circuit board in a sliding direction of the first sliding member, each of the first response members is configured for cooperating with the first trigger member to conduct or cut off one first electrical branch, and wherein each of the first electrical branches has a different load value; and
   a controller configured to determine the type of the loading unit according to a feedback signal from the first circuit board.

2. The surgical instrument according to claim 1, wherein the first sliding member may be actuated to slide under the insertion of the loading unit, so that the first trigger member is engaged with the first response member in the predetermined position.

3. The surgical instrument according to claim 1, wherein:
   the first electrical branch is conducted when the first trigger member is engaged with the first response member, and the first trigger member is in surface contact or line contact with the first response member;
   the first response member is configured as a conductive piece arranged on the first circuit board;
   the first trigger member is configured as an elastic conductive sheet; and
   one end of the first trigger member is connected to the first sliding member, and the other end of the first trigger member abuts against the first circuit board, and when the first sliding member drives the elastic conductive sheet to slide to be in contact with the conductive piece, the first electrical branch on which the conductive piece is arranged is conducted.

4. The surgical instrument according to claim 1, wherein the first electrical branch is cut off when the first trigger member is engaged with the first response member, and a length of the first trigger member is configured to match with a distance between adjacent first response members, so that one first electrical branch is cut off when the first trigger member moves to the predetermined position.

5. The surgical instrument according to claim 4, wherein:
   a frame is arranged in the outer shell of the elongated body assembly;
   a sliding groove is arranged on the frame;
   the first circuit board is fixedly arranged on a bottom portion of the sliding groove;
   the first sliding member is slidably connected to the sliding groove; and the first biasing member is located between the sliding groove and the first sliding member.

6. The surgical instrument according to claim 1, wherein the first electrical branch is cut off when the first trigger member is engaged with the first response member, and a length of the first trigger member is configured to match with a distance between adjacent first response members, so that a plurality of first electrical branches are cut off when the first trigger member moves to the predetermined position.

7. The surgical instrument according to claim 1, further comprising:
a first biasing member, adapted for biasing the first sliding member distally in an initial position for adapting with the loading unit.

8. The surgical instrument according to claim 1, further comprising:
an indicating unit, wherein the indicating unit is configured for providing a first indicating signal for indicating the type of the loading unit according to a signal from the controller.

9. The surgical instrument according to claim 1, wherein a feature portion is arranged on the proximal side of the loading unit, the feature portion comprising a recognition action surface adapted for cooperating with the recognition portion for identifying the type of the loading unit, wherein the location of the recognition action surface represents the type of the loading unit.

10. The surgical instrument according to claim 9, wherein the recognition action surface is adapted for being engaged with the first sliding member to make the first sliding member slide in a longitudinal axis direction of the elongated body assembly.

11. The surgical instrument according to claim 1, further comprising a determine portion for determining whether the loading unit is well assembled, which comprises:
a second sliding member and a third sliding member slidably arranged in the outer shell of the elongated body assembly respectively, wherein the second sliding member is configured for cooperating with an engagement nub of the loading unit, and the third sliding member is configured for cooperating with a proximal portion of the loading unit, when the loading unit is well assembled, the second sliding member is actuated to move to a set position corresponding to the type of the loading unit, and the third sliding member is actuated to move to a set position;
a second trigger member and a third trigger member, wherein the second trigger member is connected with the second sliding member, and the third trigger member is connected with the third sliding member;
a second circuit board fixedly arranged in the outer shell of the elongated body assembly, wherein the second circuit board is provided with a second response member and a third response member, the second response member is configured for cooperating with the second trigger member to switch the second electrical branch between a first state and a second state, and the third response member is configured for cooperating with the third trigger member to switch the third electrical branch between a third state and a fourth state; and signals representing at least two states are provided by the second circuit board, respectively indicating the loading unit is inserted in place and rotated in place; and
a controller configured to determine whether the loading unit is well assembled according to a feedback signal from the second circuit board.

12. The surgical instrument according to claim 11, wherein:
a second biasing member is arranged between the second sliding member and the outer shell of the elongated body assembly, when the loading unit is in inserted-in-place position, the engagement nub of the loading unit abuts against the second sliding member, and the second trigger member is engaged with the second response member to switch the second electrical branch into the first state; and when the loading unit is in rotated-in-place position, the second sliding member is biased to a distal portion of the elongated body assembly under an action of the second biasing member, and the second trigger member is disengaged from the second response member to switch the second electrical branch into the second state.

13. The surgical instrument according to claim 11, wherein:
a third biasing member is arranged between the third sliding member and the outer shell of the elongated body assembly, when the loading unit is in the inserted-in-place position and the rotated-in-place position, the third trigger member triggers the third response member to switch the third electrical branch into the third state; and when the loading unit is in the position where it is not inserted, the third sliding member is biased to a distal portion of the elongated body assembly under an action of the third biasing member, and the third trigger member is disengaged from the third response member to switch the third electrical branch into the fourth state.

14. The surgical instrument according to claim 11, wherein:
the second response member and the third response member are electrical switches, respectively, and the second trigger member and the third trigger member are configured to be engaged with the electrical switches so as to switch the states of the second electrical branch and the third electrical branch.

15. The surgical instrument according to claim 14, wherein:
a plurality of first electrical branches are connected in parallel to form a loading unit type recognition circuit, and the second electrical branch and the third electrical branch are connected in series to form a loading unit well-assembled recognition circuit; and
the loading unit type recognition circuit and the loading unit well-assembled recognition circuit are connected in series to the controller.

16. The surgical instrument according to claim 11, wherein:
the second response member/third response member is configured as an electrical contact, and the second trigger member cooperates with the second response member to form a switch for conducting or cutting off the second electrical branch; and
the third trigger member cooperates with the third response member to form a switch for conducting or cutting off the second electrical branch.

17. A surgical instrument, comprising a handle assembly adapted for being attached with a loading unit, wherein the loading unit may have various types, and the handle assembly comprising a handle portion and an elongated body assembly, wherein the elongated body assembly is provided with a recognition portion for identifying the type of the loading unit, the surgical instrument comprising:

a first sliding member slidably arranged in an outer shell of the elongated body assembly along a circumferential or circumferential tangential direction of the elongated body assembly, wherein the first sliding member is configured for being actuated by the loading unit during rotation of the loading unit, so as to be moved to a predetermined position;

a first trigger member is arranged on the first sliding member, adapted for being moved to corresponding predetermined position along with the first sliding member;

a first circuit board arranged in the outer shell of the elongated body assembly, at least two first response members are spaced arranged on the first circuit board in a circumferential direction of the elongated body assembly, each of the first response members is configured for cooperating with the first trigger member in a corresponding position to conduct or cut off one corresponding first electrical branch, and wherein each of the first electrical branches has a different load value; and a controller configured to determine the type of the loading unit according to a feedback signal from the first circuit board.

18. The surgical instrument according to claim 17, wherein the first sliding member is formed into an L-shaped slider, and the L-shaped slider comprises a first supporting arm and a second supporting arm, wherein the first supporting arm is configured for cooperating with the loading unit, and the second supporting arm is provided with the first trigger member.

19. The surgical instrument according to claim 18, wherein the first sliding member is slidably connected to a frame in the elongated body assembly, a first biasing member is arranged between the first sliding member and the supporting frame, and the first biasing member applies a force in the circumferential tangential direction of the elongated body assembly and in a direction distally from the first circuit board on the first sliding member.

20. The surgical instrument according to claim 17, wherein a proximal portion of the loading unit is provided with a recognition feature portion, the recognition feature portion comprises a recognition action surface cooperating with the recognition portion.

* * * * *